(12) United States Patent
Shin

(10) Patent No.: US 12,386,901 B2
(45) Date of Patent: Aug. 12, 2025

(54) SELECTING A DEVICE TO RESPOND TO DEVICE-AGNOSTIC USER REQUESTS

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 191 days.

(21) Appl. No.: 17/957,553

(22) Filed: Sep. 30, 2022

(65) Prior Publication Data

US 2024/0111811 A1  Apr. 4, 2024

(51) Int. Cl.
*G06F 40/30* (2020.01)
*G06F 16/9032* (2019.01)
*G06F 16/9038* (2019.01)

(52) U.S. Cl.
CPC .... *G06F 16/90332* (2019.01); *G06F 16/9038* (2019.01); *G06F 40/30* (2020.01)

(58) Field of Classification Search
CPC . G06F 16/90332; G06F 16/9038; G06F 40/30
USPC .......................................................... 704/9
See application file for complete search history.

(56) References Cited

U.S. PATENT DOCUMENTS

| | | | |
|---|---|---|---|
| 11,133,027 B1 | 9/2021 | Hardie et al. | |
| 11,275,553 B2 | 3/2022 | Amarilio et al. | |
| 2008/0109475 A1* | 5/2008 | Burmester | G06F 40/30 |
| | | | 707/999.102 |
| 2014/0172417 A1* | 6/2014 | Monk, II | G06F 40/30 |
| | | | 704/9 |
| 2014/0172953 A1* | 6/2014 | Blanksteen | H04L 51/18 |
| | | | 709/203 |
| 2020/0301661 A1* | 9/2020 | Pasko | G10L 25/60 |
| 2020/0379787 A1* | 12/2020 | Martin | G06F 16/176 |
| 2021/0056718 A1* | 2/2021 | Wang | G06V 20/56 |
| 2021/0294569 A1* | 9/2021 | Piersol | G10L 15/30 |
| 2021/0304761 A1 | 9/2021 | Kothari | |
| 2022/0115009 A1 | 4/2022 | Sharifi et al. | |
| 2023/0118962 A1* | 4/2023 | Liu | G06V 20/10 |
| | | | 704/9 |

OTHER PUBLICATIONS

Accepted Feb. 9, 2019, date of publication Mar. 4, 2019, date of current version Mar. 29, 2019. Digital Object Identifier 10.1109/Access.2019.2902812, Contextual Awareness in Human-AdvancedVehicle Systems: A Surve (Year: 2019).*

(Continued)

*Primary Examiner* — Bharatkumar S Shah
(74) *Attorney, Agent, or Firm* — Gray Ice Higdon

(57) ABSTRACT

Implementations relate to selecting a particular device, from an ecosystem of devices, to provide responses to a device-agnostic request of the user while a scenario is occurring. The user specifies a scenario and contextual features are identified from one or more devices of the ecosystem to generate scenario features indicative of the scenario occurring. The scenario features are stored with a correlation to a device that is specified by the user to handle responses while the scenario is occurring. When a subsequent device-agnostic request is received, current contextual features are identified and compared to the scenario features. Based on the comparison, the specified assistant device is selected to respond to the device-agnostic request.

20 Claims, 16 Drawing Sheets

(56) References Cited

OTHER PUBLICATIONS

P. Wijesekera et al., "The Feasibility of Dynamically Granted Permissions: Aligning Mobile Privacy with User Preferences," 2017 IEEE Symposium on Security and Privacy (SP), San Jose, CA, USA, 2017, pp. 1077-1093, doi: 10.1109/SP.2017.51. keywords: {Privacy;Context;Data privacy;Mobile communication;An (Year: 2017).*

European Patent Office; International Search Report and Written Opinion issued in Application No. PCT/US2023/034027; 11 pages; dated Jan. 8, 2024.

* cited by examiner

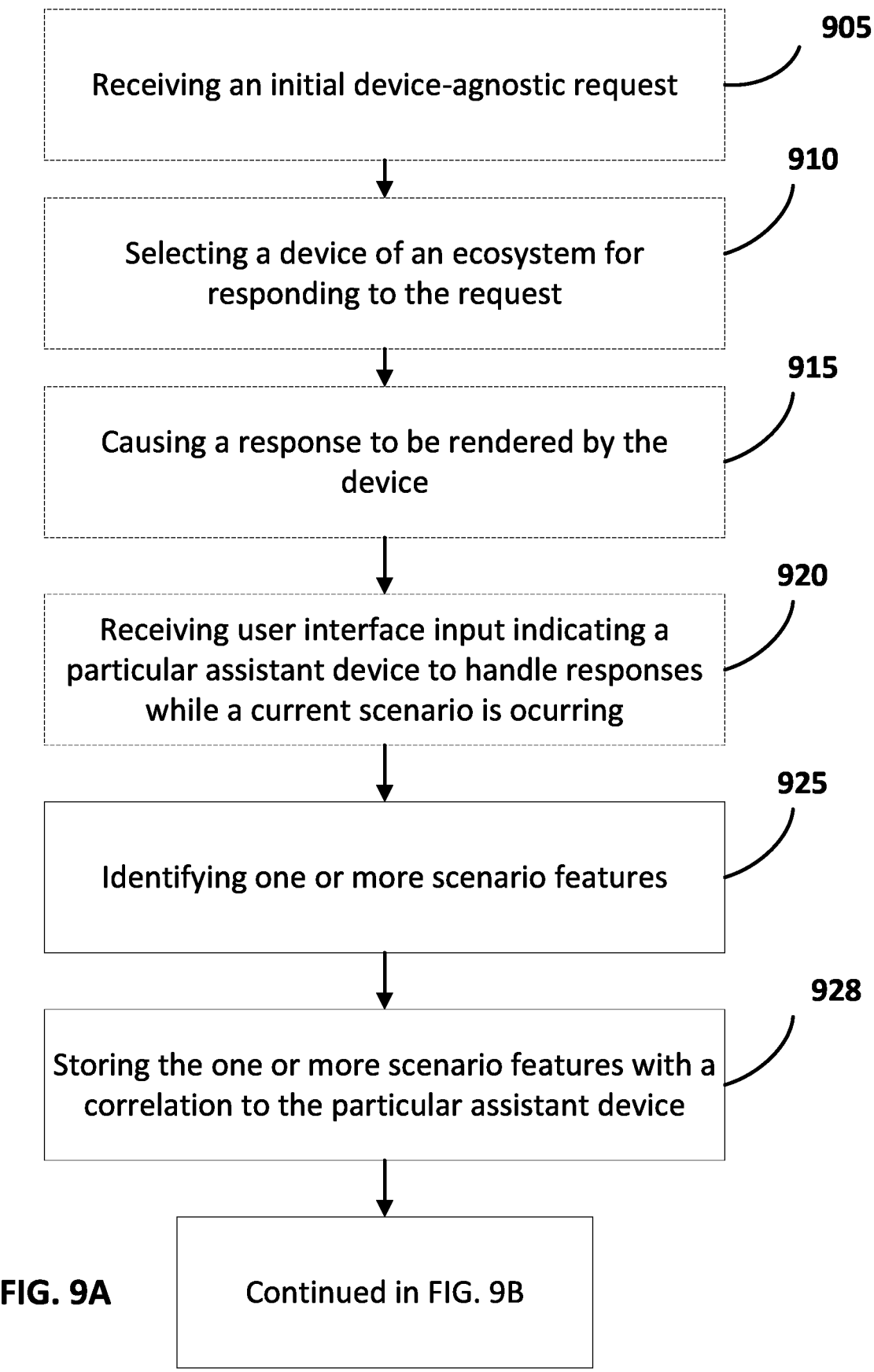

SELECTING A DEVICE TO RESPOND TO DEVICE-AGNOSTIC USER REQUESTS

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an explicit input (e.g., commands, queries, and/or requests) to the automated assistant that can cause the automated assistant to generate and provide responsive output, to control one or more Internet of things (IoT) devices, and/or to perform one or more other functionalities (e.g., assistant actions). This explicit input provided by the user can be, for example, spoken natural language input (i.e., spoken utterances) which may in some cases be converted into text (or other semantic representation) and then further processed, and/or typed natural language input.

In some cases, automated assistants may include automated assistant clients that are executed locally by assistant devices and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), audio data of a spoken utterance of a user (or a text conversion thereof), and optionally data indicative of the user's identity (e.g., credentials). The cloud-based counterpart may perform various processing on the explicit input to return result(s) to the automated assistant client, which may then provide corresponding output to the user. In other cases, automated assistants may be exclusively executed locally by assistant devices and that are engaged directly by users to reduce latency.

Many users may engage automated assistants in performing routine day-to-day tasks via assistant actions. For example, a user may routinely provide one or more explicit user inputs that cause an automated assistant to check the weather, check for traffic along a route to work, start a vehicle, and/or other explicit user input that causes the automated assistant to perform other assistant actions while the user is eating breakfast. As another example, a user may routinely provide one or more explicit user inputs that cause an automated assistant to play a particular playlist, track a workout, and/or other explicit user input that cause an automated assistant to perform other assistant actions in preparation for the user to go on a run. However, in some instances, multiple devices may be in the vicinity of the user and may be configured to respond to requests of the user. Thus, determining which device to best provide audio and/or visual output, in response to a user providing a device-agnostic request, can improve the user experience when interacting with multiple devices that are configured in an ecosystem of connected devices.

SUMMARY

Some implementations disclosed herein relate to selecting a particular device, from an ecosystem of devices, to provide a user with a response to an automated assistant request based on a user-specified scenario occurring. A user can indicate, via input to a user interface, that when a scenario is occurring, that a particular device be utilized to provide responses from an automated assistant that is executing on multiple devices that are eligible to provide responses. The user can specify that, at a particular time, the scenario is/was occurring, and one or more contextual features, generated from sensor data from one or more sensors of user devices, can be identified that can be utilized to generate scenario features indicative of the corresponding scenario occurring. The scenario features can be stored with an indication of the device to respond to requests. When the user submits a request to an automated assistant, the current contextual features can be identified and compared to the scenario features. If the similarity between the scenario features and the current contextual features satisfies a threshold (e.g., located within a threshold Euclidean distance in an embedding space), the response of the automated assistant can be provided by the corresponding user-specified device.

As an example, a user may submit, as a spoken utterance and/or via a textual interface, an indication of "When I am cooking, use my kitchen speaker." In response, scenario of "cooking" can be generated and associated with "kitchen speaker." The user can then indicate when the scenario is occurring (i.e., the user is cooking), and contextual features can be identified from one or more devices that are part of the ecosystem of devices (e.g., the "kitchen speaker," a "watch," and a "smartphone" that are part of the ecosystem of connected devices). Contextual features can include, for example, location data, temperature data, accelerometer data, and/or data from other sensors of devices that are a part of the ecosystem of devices. The contextual features can be stored as the scenario features with an indication of "kitchen speaker." Subsequently, while the user is cooking, the user can utter the utterance "OK Assistant, set a time for 10 minutes" and the current contextual features can be identified from one or more of the devices of the ecosystem. The current contextual features can be compared to the scenario features and, if similarity between the current contextual features and the scenario features satisfies a threshold, the "kitchen speaker" can be utilized to render an audio response of "Setting a timer for 10 minutes" and/or to provide an audio alert after ten minutes has elapsed.

In some implementations, a user may have an ecosystem of devices, each in communication with each other, as well as in communication with one or more cloud-based devices. The ecosystem of devices can each be executing an automated assistant client, with the cloud-based device performing one or more actions based on requests received by one or more of the automated assistant clients. For example, a user can have a smartphone, a smartwatch, and a smart speaker, all within range of the user and all devices having a microphone that can receive audio data and determine, based on the audio data, whether the user has uttered a hotword and/or invocation phrase to activate one or more of the devices. The request can be processed by one or more of the automated assistant clients and/or provided to a cloud-based automated assistant component for processing. Processing can include, for example, speech to text processing (STT), automatic speech recognition (ASR), natural language understanding processing (NLU), and/or other processing. One or more of the automated assistant components can include a fulfillment engine that can generate, based on the request, one or more actions that can be performed by one or more of the automated assistant clients and/or one or more other components.

As an example, a user can utter "OK Assistant, set a timer," and an automated assistant client executing on a smartphone can be invoked by identifying, in the utterance, the invocation phrase, "OK Assistant." The automated assistant client can perform some processing of the utterance, such as STT, and provide, as a request, a textual representation of the utterance to a cloud-base automated assistant component for further processing. The cloud-based automated assistant component can perform additional processing, such as NLU, determine that the utterance includes a request for a timer to be set, and generate a response that can be provided to, for example, an automated assistant client that is executing on a smart speaker that is a part of the ecosystem that causes the smart speaker to set an alarm and/or to perform one or more other actions such as, for example, responding with "Setting a timer." Thus, in some implementations, the same device that received the request may not be the same device that performs the requested action.

In some implementations, a user may utilize a client device to indicate, to the automated assistant client executing on the device, a particular device to handle responses when a specified scenario is occurring. For example, a user may utter the phrase "OK Assistant, I want my smartwatch to respond when I'm exercising." The scenario (i.e., "exercising") can be stored on one or more of the devices of the ecosystem for subsequent calibration with an indication of which device the user has specified to handle the requests. Subsequently, the user may be prompted as to whether the scenario is occurring, such as being prompted "Are you exercising right now?" or "What are you doing right now?" with options for the user to select. Also, for example, when the user is subsequently exercising, the user may utter "I'm exercising right now" and/or otherwise provide an indication of the current scenario that is occurring. In some implementations, this can occur at the time that the user first specified which device to handle requests. For example, a smartphone may have responded to a user while an as-yet unspecified scenario was occurring, and the user may respond with "From now on, I want my watch to respond when I'm doing this."

Once the user has confirmed that the scenario is occurring (or occurred during a previous time, such as by indicating "I worked today between 9 and 5"), one or more contextual features generated from sensor data of the sensors of one or more of the devices in the ecosystem can be identified to generate scenario features indicative of the scenario occurring. For example, temperature, location, accelerometer data, and/or other contextual features can be identified from sensors of a smartphone, a smartwatch, and a smart speaker during the time period when the scenario was occurring. In some implementations, the automated assistant of a device in the ecosystem can identify contextual features from the sensors of its device, and generate an encoding of the device-specific contextual features. Thus, for example, an automated assistant client of a smartwatch can identify accelerometer data and temperature data from sensors of the smartwatch and generate an encoding from the data. Also, for example, an automated assistant client of a smartphone can identify accelerometer data and location data from sensors of the smartphone and generate a separate encoding. Each encoding can be, for example, a vector that is in an embedding space that has a lower dimensionality than the sensor data so that, for example, computing resources can be conserved by transmitting the encoding rather than the entirety of the sensor data. Further, the encoding can be performed on the device that collected the contextual features so that, once encoded, the sensor data is only available to the device and not transmitted to, for example, a cloud-based device. Because the sensor data cannot be determined from the encoding, security is improved by not transmitting sensor data associated with the user to devices that are not in possession of the user, thereby reducing potential disclosure of the user's sensor data to third parties.

In some implementations, once the contextual features of each device are identified, the contextual features (or an encoding of the sensor data, as previously described), can be provided to a device of the ecosystem for storage. For example, one of the user devices can be designated as a hub for storage of the features and/or a cloud-based automated assistant component can receive features from the devices of the ecosystem. In some implementations, the receiving automated assistant component can store the features with the association of the scenario and the device to handle responses while the scenario is occurring. In some implementations, the receiving automated assistant component can combine, average, and/or otherwise aggregate the features before storing the contextual features to reduce storage requirements and to improve security, as previously described.

Subsequent to receiving user input indicating a device to handle responses while the user is in a scenario and further subsequent to generating the scenario features that were identified from sensors while the scenario was occurring, the user can submit a request that does not indicate which device should respond to the request. For example, the user can first indicate "Use the kitchen speaker when I'm cooking," scenario features can be generated when the user indicates that the current scenario is "cooking" (e.g., location data indicating that the user is in the kitchen, stove is on), and stored with an indication to utilize the "kitchen speaker" when the user is "cooking." Subsequently, when the user indicates "OK Assistant, set a timer for 10 minutes," current contextual features can be identified from one or more devices of the ecosystem and processed in the same manner as previously described with regards to the scenario features (e.g., encoding the features, transmitting to an automated assistant component for aggregation/averaging), and the resulting current contextual features can be compared to stored scenario features. The request can be processed by one or more automated assistant components of the ecosystem and, based on the comparison, the current scenario (i.e., "cooking") can be identified. The correlation between the scenario and the specified device (i.e., "kitchen speaker") can further be identified. The "kitchen speaker" can then be provided with response data to cause one or more actions to occur. For example, the automated assistant of the "kitchen speaker" can set a timer locally on the device and/or the speaker of the "kitchen speaker" can provide, as a response, "setting a timer for 10 minutes." Further, when the timer has expired, an alert can be provided to the user via "kitchen speaker."

The above description is provided as an overview of only some implementations disclosed herein. Those implementations, and other implementations, are described in additional detail herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 9A and FIG. 9B is a flowchart illustrating an example method according to various implementations disclosed herein.

DETAILED DESCRIPTION

Figure 1:
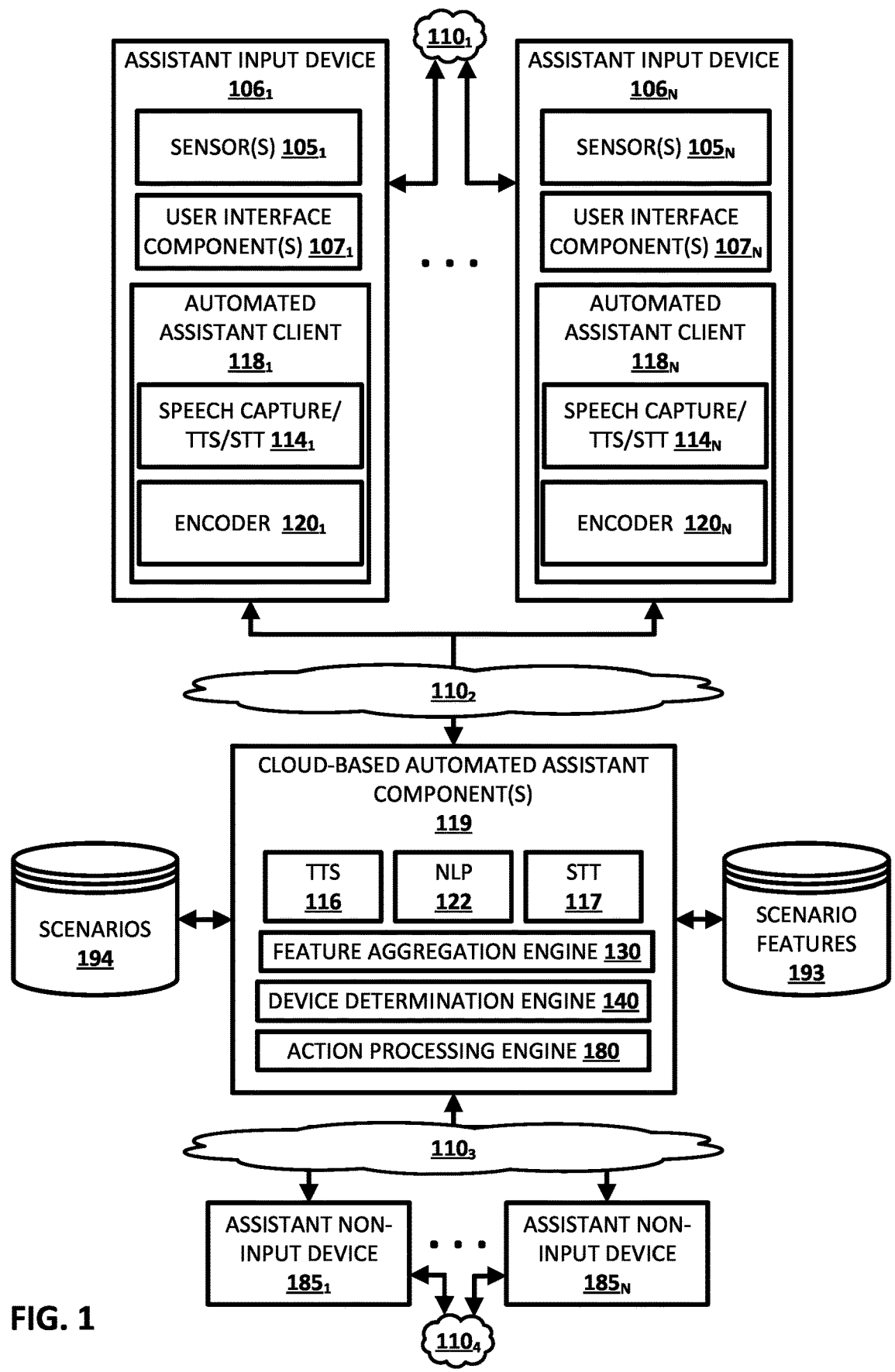
FIG. 1 is a block diagram of an example environment in which implementations disclosed herein may be implemented.

Turning now to FIG. 1, an example environment in which techniques disclosed herein may be implemented is illustrated. The example environment includes a plurality of assistant input devices $106_{1-N}$ (also referred to herein simply as "assistant input devices 106"), one or more cloud-based automated assistant components 119, and/or one or more assistant non-input devices $185_{1-N}$ (also referred to herein simply as "assistant non-input devices 185"). The assistant input devices 106 and the assistant non-input device 185 of FIG. 1 may also be referred to collectively herein as "assistant devices".

One or more (e.g., all) of the assistant input devices 106 can execute a respective instance of a respective automated assistant client $118_{1-N}$. However, in some implementations one or more of the assistant input devices 106 can optionally lack an instance of the respective automated assistant client $118_{1-N}$, and still include engine(s) and hardware components for receiving and processing user input directed to an automated assistant (e.g., microphone(s), speaker(s), speech recognition engine(s), natural language processing engine(s), speech synthesis engine(s), and so on). An instance of the automated assistant client $118_{1-N}$ can be an application that is separate from an operating system of the respective assistant input devices 106 (e.g., installed "on top" of the operating system)—or can alternatively be implemented directly by the operating system of the respective assistant input devices 106. As described further below, each instance of the automated assistant client $118_{1-N}$ can optionally interact with one or more cloud-based automated assistant components 119 in responding to various requests provided by respective user interface components $107_{1-N}$ of any one of the respective assistant input devices 106. Further, and as also described below, other engine(s) of the assistant input devices 106 can optionally interact with one or more of the cloud-based automated assistant components 119.

One or more the cloud-based automated assistant components 119 can be implemented on one or more computing systems (e.g., server(s) collectively referred to as a "cloud" or a "remote" computing system) that are communicatively coupled to respective assistant input devices 106 via one or more local area networks ("LANs," including Wi-Fi LANs, Bluetooth networks, near-field communication networks, mesh networks, etc.), wide area networks ("WANs,", including the Internet, etc.), and/or other networks. The communicative coupling of the cloud-based automated assistant components 119 with the assistant input devices 106 is indicated generally by $110_1$ of FIG. 1. Also, in some implementations, the assistant input devices 106 may be communicatively coupled with each other via one or more networks (e.g., LANs and/or WANs), indicated generally by $110_2$ of FIG. 1.

The one or more cloud-based automated assistant components 119 can also be communicatively coupled with the assistant non-input devices 185 via one or more networks (e.g., LANs, WANs, and/or other networks). The communicative coupling of the cloud-based automated assistant components 119 with the assistant non-input system(s) 180 is indicated generally by $110_3$ of FIG. 1. In some implementations, one or more corresponding assistant non-input systems (not depicted for the sake of clarity) can be communicatively coupled to one or more (e.g., groups) of the assistant non-input devices 185 via one or more networks (e.g., LANs, WANs, and/or other network(s)). For example, a first assistant non-input system can be communicatively coupled with, and receive data from, a first group of one or more of the assistant non-input devices 185, a second assistant non-input system can be communicatively coupled with, and receive data from, a second group of one or more of the assistant non-input devices 185, and so on. Also, in some implementations, one or more (e.g., groups or all) of the assistant non-input devices 185 may be communicatively coupled with each other via one or more networks (e.g., LANs, WANs, and/or other network(s)), indicated generally by $110_4$ of FIG. 1. The networks $110_{1-4}$ of FIG. 1 may also be referred to collectively herein as "network(s) 110".

An instance of an automated assistant client 118, by way of its interactions with one or more of the cloud-based automated assistant components 119, may form what appears to be, from a user's perspective, a logical instance of an automated assistant with which the user may engage in a human-to-computer dialog. For example, a first automated assistant can be encompassed by automated assistant client $118_1$ of assistant input device $106_1$ and one or more cloud-based automated assistant components 119. A second automated assistant can be encompassed by automated assistant client $118_N$ of assistant input device $106_N$ and one or more cloud-based automated assistant components 119. The first automated assistant and the second automated assistant of may also be referred to herein simply as "the automated assistant". It thus should be understood that each user that engages with an automated assistant client 118 executing on one or more of the assistant input devices 106 may, in effect, engage with his or her own logical instance of an automated assistant (or a logical instance of automated assistant that is shared amongst a household or other group of users and/or shared amongst multiple automated assistant clients 118). Although only a plurality of assistant input devices 106 are illustrated in FIG. 1, it is understood that cloud-based automated assistant component(s) 119 can additionally serve many additional groups of assistant input devices. Moreover, although various engines of the cloud-based automated assistant components 119 are described herein as being implemented separate from the automated assistant clients 118 (e.g., at server(s)), it should be understood that it is for the sake of example and is not meant to be limiting. For instance, one or more (e.g., all) of the engines described with respect to the cloud-based automated assistant components 119 can be implemented locally by one or more of the assistant input devices 106.

The assistant input devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated assistant. Additional and/or alternative assistant input devices may be provided. The assistant non-input devices 185 may include many of the same devices as the assistant input devices 106, but are not capable of receiving user input directed to the automated assistant (e.g., do not include user interface input component(s)). Although the assistant non-input devices 185 do not receive user input directed to the automated assistant, the assistant non-input devices 185 may still be controlled by the automated assistant.

In some implementations, the plurality of assistant input devices 106 and assistant non-input devices 185 can be associated with each other in various ways in order to facilitate performance of techniques described herein. For example, in some implementations, the plurality of assistant input devices 106 and assistant non-input devices 185 may be associated with each other by virtue of being communicatively coupled via one or more networks (e.g., via the network(s) 110 of FIG. 1). This may be the case, for instance, where the plurality of assistant input devices 106 and assistant non-input devices 185 are deployed across a particular area or environment, such as a home, a building, and so forth. Additionally, or alternatively, in some implementations, the plurality of assistant input devices 106 and assistant non-input devices 185 may be associated with each other by virtue of them being members of a coordinated ecosystem that are at least selectively accessible by one or more users (e.g., an individual, a family, employees of an organization, other predefined groups, etc.). In some of those implementations, the ecosystem of the plurality of assistant input devices 106 and assistant non-input devices 185 can be manually and/or automatically associated with each other in a device topology representation of the ecosystem.

The assistant non-input devices 185 and the corresponding non-input systems can include one or more first-party (1P) devices and systems and/or one or more third-party (3P) devices and systems. A 1P device or system references a system that is controlled by a party that is the same as the party that controls the automated assistant referenced herein. In contrast, a 3P device or system references a system that is controlled by a party that is distinct from the party that controls the automated assistant referenced herein.

The assistant non-input devices 185 can selectively transmit data (e.g., state(s), state change(s), and/or other data) to the automated assistant over the network(s) 110, and optionally via corresponding assistant non-input system(s). For example, assume assistant non-input device $185_1$ is a smart doorbell IoT device. In response to an individual pressing a button on the doorbell IoT device, the doorbell IoT device can transmit corresponding data directly to the automated assistant and/or to an assistant non-input system(s) managed by a manufacturer of the doorbell that may be a 1P system or 3P system. The automated assistant (or the assistant non-input system) can determine a change in a state of the doorbell IoT device based on such data. For instance, the automated assistant (or the assistant non-input system) can determine a change in the doorbell from an inactive state (e.g., no recent pressing of the button) to an active state (recent pressing of the button). Notably, although user input is received at the assistant non-input device $185_1$ (e.g., the pressing of the button on the doorbell), the user input is not directed to the automated assistant (hence the term "assistant non-input device"). As another example, assume assistant non-input device $185_1$ is a smart thermostat IoT device that has microphone(s), but the smart thermostat does not include the automated assistant client 118. An individual can interact with the smart thermostat (e.g., using touch input or spoken input) to change a temperature, set particular values as setpoints for controlling an HVAC system via the smart thermostat, and so on. However, the individual cannot communicate directly with the automated assistant via the smart thermostat, unless the smart thermostat includes the automated assistant client 118.

In various implementations, one or more of the assistant input devices 106 may include one or more respective sensors $105_{1-N}$ (also referred to herein simply as "sensors 105") that are configured to provide, with approval from corresponding user(s), signals indicative of one or more environmental conditions present in the environment of the device. In some of those implementations, the automated assistant can identify one or more of the assistant input devices 106 to satisfy a spoken utterance from a user that is associated with the ecosystem. The spoken utterance can be satisfied by rendering responsive content (e.g., audibly and/or visually) at one or more of the assistant input devices 106, by causing one or more of the assistant input devices 106 and/or the assistant non-input devices 185 to be controlled based on the spoken utterance, and/or by causing one or more of the assistant input devices 106 and/or the assistant non-input devices 185 to perform any other action to satisfy the spoken utterance.

The respective sensors 105 may come in various forms. Some assistant input devices 106 may be equipped with one or more digital cameras that are configured to capture and provide signal(s) indicative of movement detected in their fields of view. Additionally, or alternatively, some assistant input devices 106 may be equipped with other types of light-based sensors 105, such as passive infrared ("PIR") sensors that measure infrared ("IR") light radiating from objects within their fields of view. Additionally, or alternatively, some assistant input devices 106 may be equipped with sensors 105 that detect acoustic (or pressure) waves, such as one or more microphones. Moreover, in addition to the assistant input devices 106, one or more of the assistant non-input devices 185 can additionally or alternatively include respective sensors 105 described herein, and signals from such sensors can additionally be utilized by the automated assistant in determining whether and/or how to satisfy spoken utterances according to implementations described herein.

Additionally, or alternatively, in some implementations, the sensors 105 may be configured to detect other phenomena associated with the environment that includes at least a part of the ecosystem. For example, in some embodiments, a given one of the assistant devices 106, 185 may be equipped with a sensor 105 that detects various types of wireless signals (e.g., waves such as radio, ultrasonic, electromagnetic, etc.) emitted by, for instance, other assistant devices carried/operated by a particular user (e.g., a mobile device, a wearable computing device, etc.) and/or other assistant devices in the ecosystem. For example, some of the assistant devices 106, 185 may be configured to emit waves that are imperceptible to humans, such as ultrasonic waves or infrared waves, that may be detected by one or more of the assistant input devices 106 (e.g., via ultrasonic/infrared receivers such as ultrasonic-capable microphones). Also, for example, in some embodiments, a given one of the assistant devices 106, 185 may be equipped with a sensor 105 to detect movement of the device (e.g., accelerometer), temperature in the vicinity of the device, and/or other environmental conditions that can be detected near the device (e.g., a heart monitor that can detect the current heart rate of the user).

Additionally, or alternatively, various assistant devices may emit other types of human-imperceptible waves, such as radio waves (e.g., Wi-Fi, Bluetooth, cellular, etc.) that may be detected by other assistant devices carried/operated by a particular user (e.g., a mobile device, a wearable computing device, etc.) and used to determine an operating user's particular location. In some implementations, GPS and/or Wi-Fi triangulation may be used to detect a person's location, e.g., based on GPS and/or Wi-Fi signals to/from the assistant device. In other implementations, other wireless signal characteristics, such as time-of-flight, signal strength, etc., may be used by various assistant devices, alone or collectively, to determine a particular person's location based on signals emitted by the other assistant devices carried/operated by the particular user.

Additionally, or alternatively, in some implementations, one or more of the assistant input devices 106 may perform voice recognition to recognize a user from their voice. For example, some instances of the automated assistant may be configured to match a voice to a user's profile, e.g., for purposes of providing/restricting access to various resources. Various techniques for user identification and/or authorization for automated assistants have been utilized. For example, in identifying a user, some automated assistants utilize text-dependent techniques (TD) that is constrained to invocation phrase(s) for the assistant (e.g., "OK Assistant" and/or "Hey Assistant"). With such techniques, an enrollment procedure is performed in which the user is explicitly prompted to provide one or more instances of a spoken utterance of the invocation phrase(s) to which the TD features are constrained. Speaker features (e.g., a speaker embedding) for a user can then be generated through processing of the instances of audio data, where each of the instances captures a respective one of the spoken utterances. For example, the speaker features can be generated by processing each of the instances of audio data using a TD machine learning model to generate a corresponding speaker embedding for each of the utterances. The speaker features can then be generated as a function of the speaker embeddings, and stored (e.g., on device) for use in TD techniques. For example, the speaker features can be a cumulative speaker embedding that is a function of (e.g., an average of) the speaker embeddings. Text-independent (TI) techniques have also been proposed for utilization in addition to or instead of TD techniques. TI features are not constrained to a subset of phrase(s) as is in TD. Like TD, TI can also utilize speaker features for a user and can generate those based on user utterances obtained through an enrollment procedure and/or other spoken interactions, although many more instances of user utterances may be required for generating useful TI speaker features.

After the speaker features are generated, the speaker features can be used in identifying the user that spoke a spoken utterance. For example, when another spoken utterance is spoken by the user, audio data that captures the spoken utterance can be processed to generate utterance features, those utterance features compared to the speaker features, and, based on the comparison, a profile can be identified that is associated with the speaker features. As one particular example, the audio data can be processed, using the speaker recognition model, to generate an utterance embedding, and that utterance embedding compared with the previously generated speaker embedding for the user in identifying a profile of the user. For instance, if a distance metric between the generated utterance embedding and the speaker embedding for the user satisfies a threshold, the user can be identified as the user that spoke the spoken utterance.

Each of the assistant input devices 106 further includes respective user interface component(s) $107_{1-N}$ (also referred to herein simply as "user interface component(s) 107"), which can each include one or more user interface input devices (e.g., microphone, touchscreen, keyboard, and/or other input devices) and/or one or more user interface output devices (e.g., display, speaker, projector, and/or other output devices). As one example, user interface components $107_{10}$f assistant input device $106_1$ can include only speaker(s) and microphone(s), whereas user interface components $107_N$ of assistant input device $106_N$ can include speaker(s), a touchscreen, and microphone(s). Additionally, or alternatively, in some implementations, the assistant non-input devices 185 may include one or more user interface input devices and/or one or more user interface output devices of the user interface component(s) 107, but the user input devices (if any) for the assistant non-input devices 185 may not allow the user to directly interact with the automated assistant.

Each of the assistant input devices 106 and/or any other computing device(s) operating one or more of the cloud-based automated assistant components 119 may include one or more memories for storage of data and software applications, one or more processors for accessing data and executing applications, and other components that facilitate communication over a network. The operations performed by one or more of the assistant input devices 106 and/or by the automated assistant may be distributed across multiple computer systems. The automated assistant may be implemented as, for example, computer programs running on one or more computers in one or more locations that are coupled to each other through a network (e.g., the network(s) 110 of FIG. 1).

As noted above, in various implementations, each of the assistant input devices 106 may operate a respective automated assistant client 118. In various embodiments, each automated assistant client 118 may include a respective speech capture/text-to-speech (TTS)/speech-to-text (STT) module $114_{1-N}$ (also referred to herein simply as "speech capture/TTS/STT module 114"). In other implementations, one or more aspects of the respective speech capture/TTS/STT module 114 may be implemented separately from the respective automated assistant client 118 (e.g., by one or more of the cloud-based automated assistant components 119).

Each respective speech capture/TTS/STT module 114 may be configured to perform one or more functions including, for example: capture a user's speech (speech capture, e.g., via respective microphone(s) (which in some cases may comprise one or more of the sensors 105)); convert that captured audio to text and/or to other representations or embeddings (STT) using speech recognition model(s) stored in the ML model(s) database 192; and/or convert text to speech (TTS) using speech synthesis model(s) stored in the ML model(s) database 192. Instance(s) of these model(s) may be stored locally at each of the respective assistant input devices 106 and/or accessible by the assistant input devices (e.g., over the network(s) 110 of FIG. 1). In some implementations, because one or more of the assistant input devices 106 may be relatively constrained in terms of computing resources (e.g., processor cycles, memory, battery, etc.), the respective speech capture/TTS/STT module 114 that is local to each of the assistant input devices 106 may be configured to convert a finite number of different spoken phrases to text (or to other forms, such as lower dimensionality embeddings) using the speech recognition model(s). Other speech input may be sent to one or more of the cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processing (NLP) module 122) using speech recognition model(s) stored in the ML model(s) database 192. Cloud-based TTS module 116 may be configured to leverage the virtually limitless resources of the cloud to convert textual data (e.g., text formulated by automated assistant) into computer-generated speech output using speech synthesis model(s) stored in the ML model(s) database 192. In some implementations, the cloud-based TTS module 116 may provide the computer-generated speech output to one or more of the assistant devices 106, 185 to be output directly, e.g., using respective speaker(s) of the respective assistant devices. In other implementations, textual data (e.g., a client device notification included in a command) generated by the automated assistant using the cloud-based TTS module 116 may be provided to speech capture/TTS/STT module 114 of the respective assistant devices, which may then locally convert the textual data into computer-generated speech using the speech synthesis model(s), and cause the computer-generated speech to be rendered via local speaker(s) of the respective assistant devices.

The NLP module 122 processes natural language input generated by users via the assistant input devices 106 and may generate annotated output for use by one or more other components of the automated assistant, the assistant input devices 106, and/or the assistant non-input devices 185. For example, the NLP module 122 may process natural language free-form input that is generated by a user via one or more respective user interface input devices of the assistant input devices 106. The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 122 may rely on annotations from one or more other components of the NLP module 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations—such as an assistant input device notification rendered immediately prior to receiving the natural language input on which the assistant input device notification is based.

Figure 2:
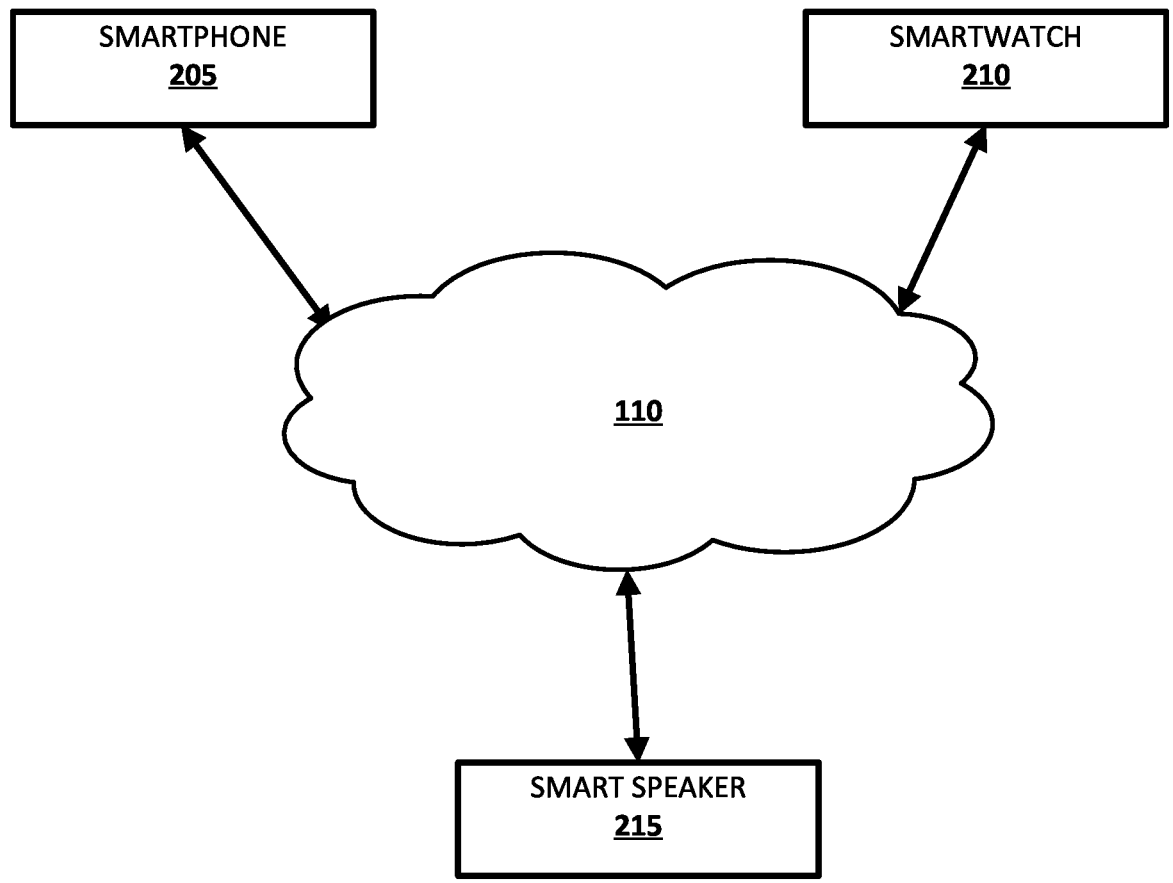
FIG. 2 is an illustration of an example ecosystem of connected devices.
Figure 3:
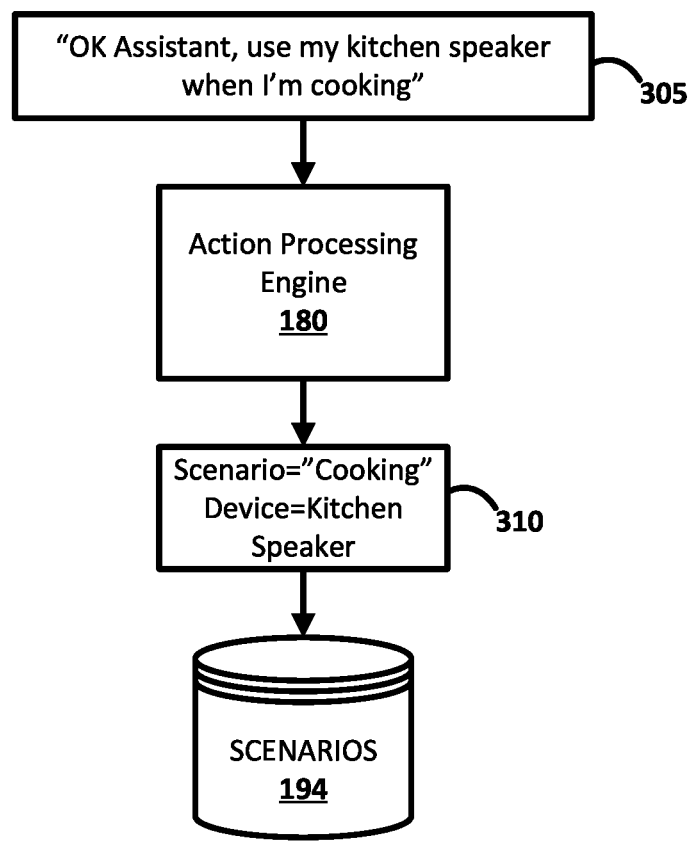
FIG. 3 is a flowchart illustrating an example method for correlating a particular assistant device with a scenario based on user interface input.

Referring to FIG. 2, an illustration of an ecosystem of connected devices is provided for example purposes. In some implementations, an ecosystem can include additional components, fewer components, and/or different components than what are illustrated in FIG. 2. However, for example, purposes with regards to examples further described in relation to FIGS. 3-5 and FIGS. 6A-6F, an ecosystem will be utilized as an example that includes a smartphone 205, a smartwatch 210, and a smart speaker 215, each including one or more components of an assistant input device 106. For example, smartphone 205 can be executing an automated assistant client 118 that further includes one or more of the components of the automated assistant client 118 illustrated in FIG. 1 (and further, one or more sensors 105 and/or user interface components 107). The ecosystem of FIG. 2 can include devices that are connected to one another and that are further in the vicinity of the user. For example, a user may have a smartphone 105 sitting on a counter in the kitchen, wearing a smartwatch 210, and a smart speaker may be permanently connected in the kitchen. Thus, for explanation purposes only, speakers of devices 205, 210, and 215 can be heard by the user (thus can respond to requests) and/or microphones of the devices 205, 210, and 215 can capture audio data of a user uttering an invocation phrase and/or request.

Further, for exemplary purposes only, examples described herein will assume that the cloud-based assistant components 119 will perform one or more actions. However, it is to be understood that one or more of the assistant input devices 106 can include one or more of the components illustrated in FIG. 1 as being components of the cloud-based assistant and can be performed by a device of the ecosystem that includes one or more of the components. For example, a smart speaker 215 can include one or more of the components of the cloud-based assistant components 119 and can, in some configurations, receive and process requests in the same manner as described herein with regards to the cloud-based automated assistant components 119. Further, one or more other components, such as scenarios database 194 and/or scenario features database 193 may be accessible to one or more of the assistant input devices 106. Thus, although some requests and/or other information is described as being provided to a cloud-based device for further processing, storage, and/or retrieval, it is to be understood that scenarios database 194 and/or scenario features database 193 may be accessible directly by assistant input devices 106 and/or may be a component of assistant input devices 106 (e.g., one or more of the assistant input devices 106 may have a scenarios database 194 and/or may directly store entries in a scenarios database 194 that is shared by the assistant input devices 106).

In some implementations, action processing engine 180 can receive a request from a user that indicates that the user has an interest in a particular device to handle responses when a scenario is occurring. For example, referring to FIG. 3, a flowchart is illustrated whereby a user has initiated a request that indicates user interest in responses to be provided by a particular device when a scenario is occurring. The request 305 can be received by one or more of the assistant input devices 106 and can be provided to, for example, one or more cloud-based automated assistant components 119 for further processing. For example, the request 305 can be received by smartphone 205 and provided to the action processing engine 180 executing on another device. In response, and utilizing one or more techniques described herein, action processing engine 180 can generate response data 310 that indicates that an entry be stored in a scenarios database 194 that can store scenarios and a corresponding device to be utilized for responses when the scenario is occurring. In this example, the response data 310 includes an indication that a scenario is "cooking" and further that a "kitchen speaker" (e.g., smart speaker 215) be utilized for responses when the identified scenario is "cooking." The correlation can be stored in scenarios database 194 for later utilizing when determining the current scenario and which device to utilize for responses that are received while the current scenario is occurring, as described further herein.

In some implementations, a user can indicate that a scenario is currently occurring and/or that a scenario occurred during some previous temporal period. For example, a user can indicate, via an interface of a device that is a part of the ecosystem of devices, that a scenario is occurring by either being prompted (asking the user "Are you cooking right now" and/or an option for the user to select a current scenario that is occurring) and/or by otherwise indicating a previously specified scenario and a temporal period when the scenario occurred ("I'm cooking right now," "I was working today between 8 and 5").

Figure 4A:
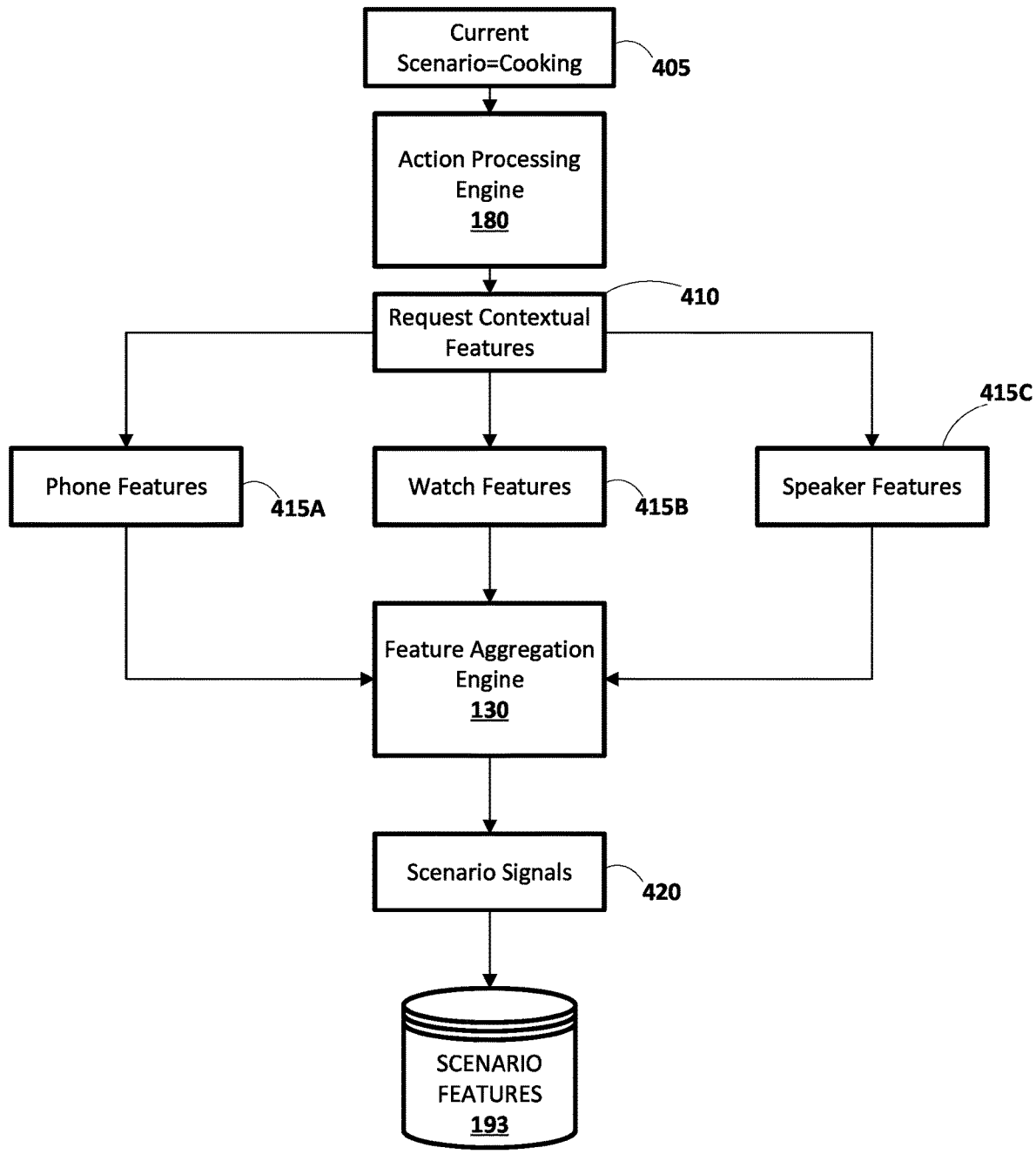
FIG. 4A is a flowchart illustrating an example method for generating scenario features.

Referring to FIG. 4A, a scenario indication 405 is received that indicates a current scenario (i.e., "Cooking") that can be provided, by one of the devices of the ecosystem of connected devices to action processing engine 180 (e.g., the user indicating via, for example, smartphone 205, that the current scenario that is occurring is "Cooking"). In response, action processing engine 180 can provide a request 410, to one or more of the devices 106 (e.g., a smartphone, a smartwatch, and a smart speaker) to provide contextual features that are indicative of values of one or more sensors of the respective devices. In response, a smartphone can provide phone features 415A, a watch can provide watch features 415B, and a smart speaker can provide speaker features 415C. Each device can provide features that are reflective of the types of sensors the respective device has equipped. For example, a smartphone can provide phone features 415A that include a location and accelerometer data. Further, a smartwatch can provide watch features 415B that include heart rate monitor data. Still further, a smart speaker can provide speaker features 415C that include audio data information (e.g., amplitude of captured audio data) and/or other information (e.g., feature data indicative of presence of the user in proximity of the speaker and/or indicative of presence of other devices in proximity of the speaker).

In some implementations, one or more of the devices can perform encoding of sensor data before providing features to a feature aggregation engine 130 for further processing. For example, referring again to FIG. 1, each of the automated assistant clients 118 can include an encoder 120 that takes, as input, data from one or more sensors of the respective device, and provides, as output, an encoded version of the sensor data. The encoded version of the sensor data can include, for example, a vector that is embedded in an embedding space that can reduce the dimensionality of the sensor data (e.g., reduce multiple sensor readings from multiple sensors to a single vector) as well as improve security by not directly providing sensor data (e.g., encoding such that the resulting vector is representative of a plurality of sensor data values without directly providing the sensor data). Thus, in FIG. 4A, phone features 415A, watch features 415B, and speaker features 415C can be sensor data captured by sensors of each respective device or can be a vector (or other representation) indicative of the sensor data such that, for example, sensor data is not available to components that are not directly within the environment of the user.

In some implementations, an initial scenario (or set of scenarios) can be determined based on multiple users that have specified scenarios and associated contextual features. For example, before the user explicitly indicates a scenario, one or more default scenarios can be identified with default contextual features that can be utilized to suggest possible scenarios to the user and/or otherwise identify when a scenario is occurring but has not yet been specified by the user. Thus, one or more candidate scenarios can be identified, the user can be prompted as to whether a particular scenario is currently occurring, and contextual features can be identified if the user affirmatively responds that the candidate scenario is occurring. Thus, the user can be proactively prompted to set up a scenario before giving an explicit request to do so.

Feature aggregation engine 130 can receive, as input, sensor data from other devices and/or representations of sensor data from other devices, and as output, generate a scenario feature 420 that is indicative of all of the sensor data that is captured while the scenario is occurring. For example, feature aggregation engine 130 can receive phone features 405A in the form of a vector representative of the sensor data from sensors of the smartphone 205, watch features 410A in the form of a vector representation of the sensor data from sensors of smartwatch 210, and speaker features 415C in the form of a vector representation of the sensor data from sensors of smart speaker 215. In response feature aggregation engine 130 can generate a single embedding that is representative of the various features, which can be embedded in an embedding space that can be utilized to compare subsequently received device features to the scenario features 420. The scenario features 420 can be stored in scenario features database 193, with an indication of the corresponding scenario, for subsequent comparisons.

Figure 4B:
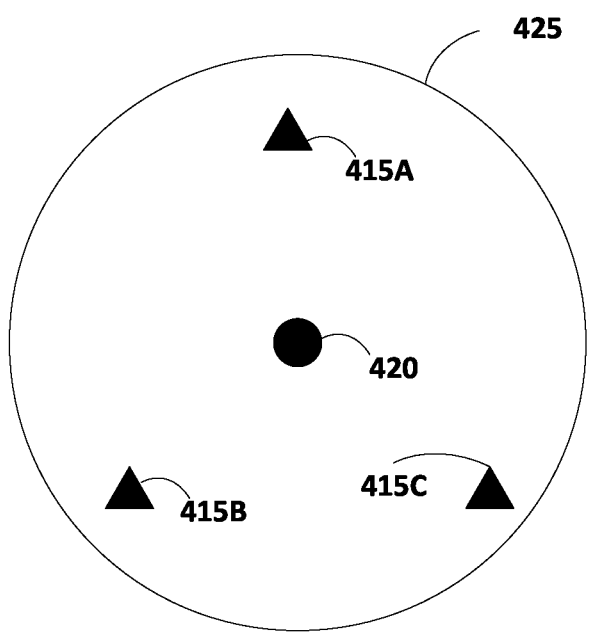
FIG. 4B is an illustration of an embedding space that indicates embedded contextual features and generated scenario features.
Figure 5:
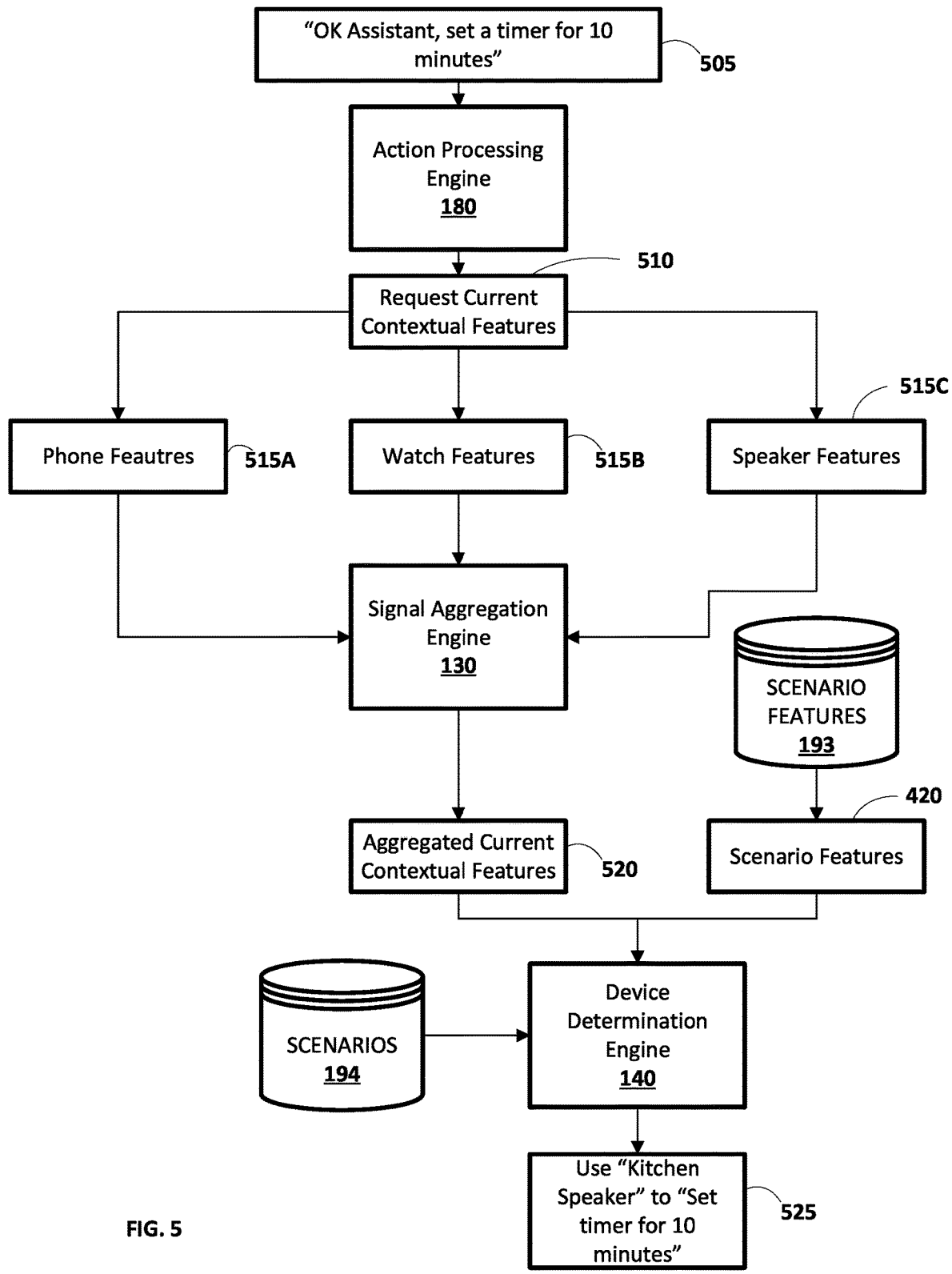
FIG. 5 is a flowchart illustrating a method of selecting a particular assistant device to respond to a device-agnostic request based on current contextual features.
Figure 6A:
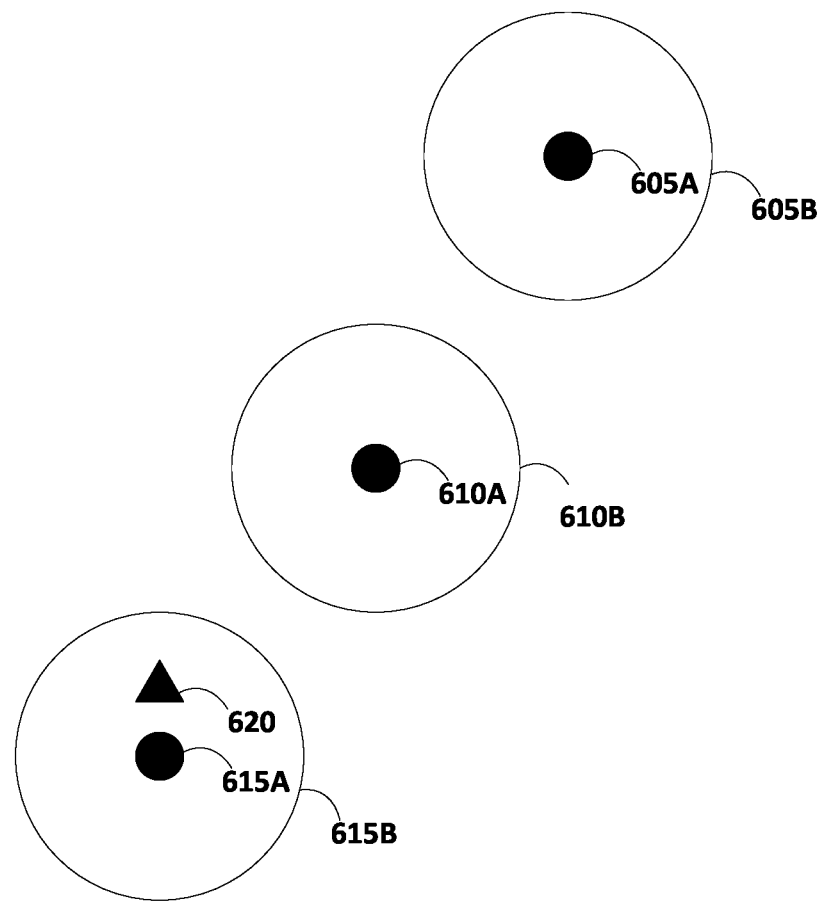
FIG. 6A, FIG. 6B, FIG. 6C, and FIG. 6D each illustrate an embedding space with scenario features and current contextual features illustrated.
Figure 6B:
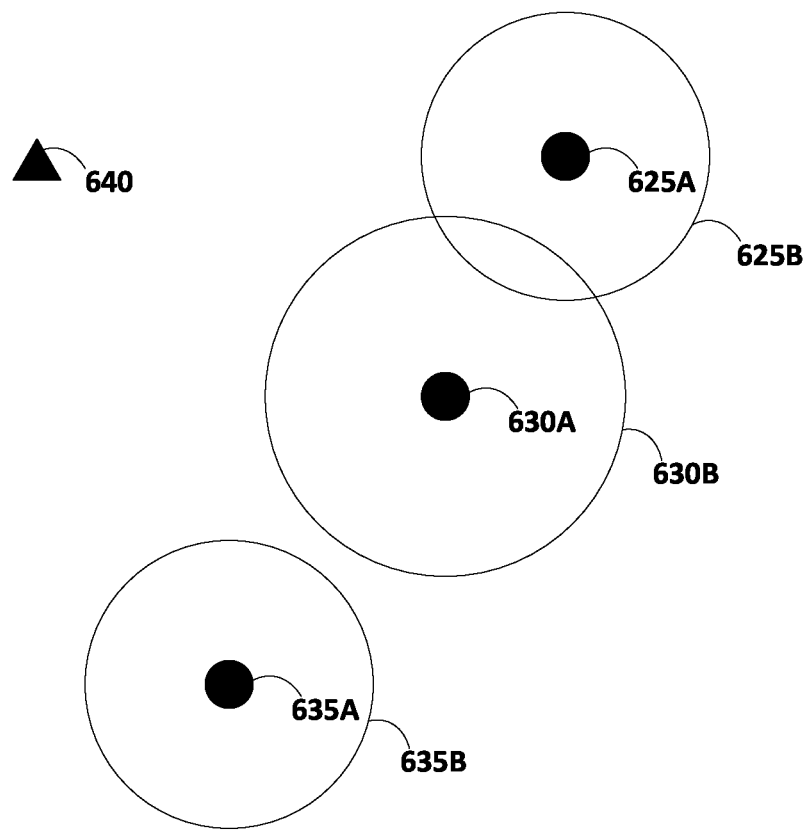
Figure 6C:
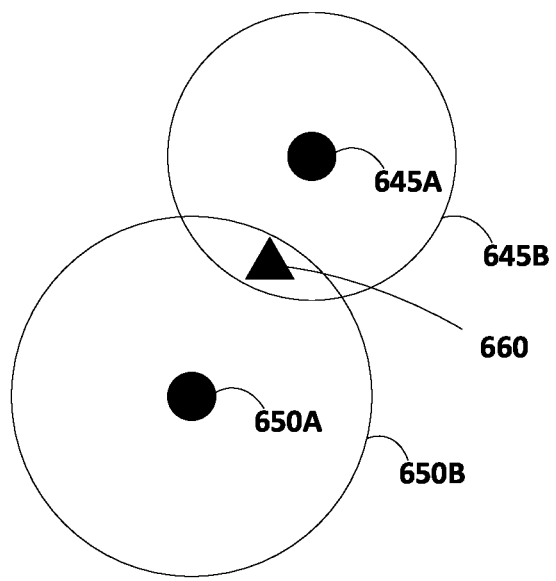
Figure 6D:
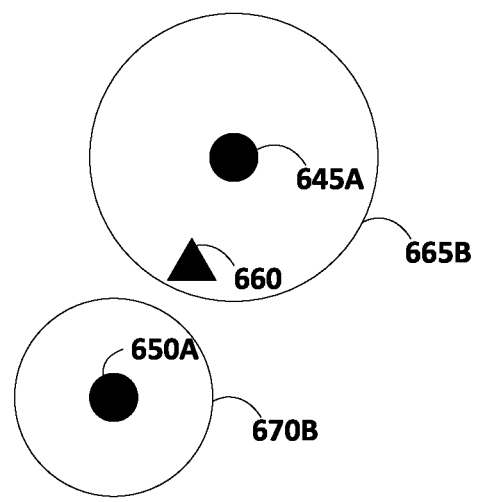

As an example, referring to FIG. 4B, contextual features from three devices are illustrated in an embedding space of features. As illustrated, each of the contextual features 415A, 415B, and 415C occupy a location in the embedding space. feature aggregation engine 130 can determine, based on the device contextual features, a scenario feature 420 that represents the contextual features in the embedding space. Further, feature aggregation engine 130 can determine an area 425 that, when subsequently receiving current contextual features that are embedded within the area 425, indicates that the corresponding scenario is occurring, as further described herein.

In some implementations, one or more of the devices 106 of the ecosystem can receive a device-agnostic assistant request. For example, referring to FIG. 5, a flowchart is provided that illustrates utilizing one or more current contextual features to determine which device, from an ecosystem of devices, to utilize for responses. A device-agnostic request 505 can be received from one or more of the devices of the ecosystem, such as smartphone 205 according to one or more techniques described herein. The request indicates an action that the user has interest in being performed but does not indicate which device should handle the request (e.g., which device should set a timer, which device should respond to the request). Action processing engine 180 can determine response data 510 to initiate a response to the request. As illustrated, the device-agnostic request 505 of "OK Assistant, set a timer for 10 minutes" is processed and action processing engine 180 can determine that a responding device is not specified. To determine which device should respond to the user, response data 510 can be provided to the devices of the ecosystem to request current contextual features. In response to being provided with the response data 510, the client devices 106 (e.g., smartphone 205, smartwatch 210, and/or smart speaker 215) can each provide current contextual features indicative of sensor data captured by sensors of the corresponding device(s), as previously described with regards to FIG. 4A-4B. Thus, in some implementations, phone features 515A, watch features 515B, and/or speaker features 515C can each be an encoding of the sensor data from the respective devices, which then can be aggregated by feature aggregation engine 130 into a single embedding in an embedding space, resulting in aggregated current contextual features 520.

Device determination engine 140 can determine, based on current contextual features and scenario features that were previously generated, which scenario (if any) is currently occurring. For example, scenario features 420 can include an embedding for a "cooking" scenario, a "working" scenario, and an "exercising" scenario. As an illustration, referring to FIG. 6, three scenario features are illustrated. For exemplary purposes only, scenario feature 605A is a scenario feature for an "exercising" scenario, scenario feature 610A is a scenario feature for a "work" scenario, and scenario feature 615A is a "cooking" signal. Each of the scenario features 605A, 610A, and/or 615A can be generated as described and illustrated in FIG. 4A-4B.

Device determination engine 140 can determine whether the current contextual features 620 are within a threshold distance to one of the scenario features and/or which scenario feature the current contextual feature 620 is closest to. As illustrated, each of the scenario features is associated with an area (as illustrated, a circle, but threshold areas can be of any geometric shape). For example, area 605B surrounds scenario feature 605A and any current contextual features that are embedded within the area 605B can be identified as a match to scenario feature 605A. Likewise, scenario feature 610A is surrounded by area 610B and scenario feature 615A is surrounded by area 615B. Further, as illustrated, current contextual feature 620 is embedded within area 615B, which, in this example, is indicative of a "cooking" scenario. Thus, device determination engine 140 can identify, in scenarios database 194, a device that is associated with a "cooking" scenario. Going back to the previous example regarding FIG. 3, a "cooking" scenario was associated with a "kitchen speaker" device. In response, fulfillment data 525 is generated that indicates to use the "kitchen speaker" to set the requested timer.

In some implementations, when current contextual features are identified (and/or aggregated into a single embedding by feature aggregation engine 130), the current contextual feature(s) may not be within a threshold distance of a scenario feature. For example, referring to FIG. 6B, an illustration of an embedding space is provided that includes three scenario features 625A, 630A, and 635A, each with a respective threshold area 625B, 630B, and 635B. Further, the illustration includes a current contextual value 640. The current contextual value 640 is not within the area of any of the scenario features such that no device has been indicated by the user to utilize for responses in the current scenario. In some implementations, one or more other techniques can be utilized to determine which device to utilize for handling responses with the user. For example, the closest device to the user can be determined, utilizing one or more techniques, and the determined closest device can provide responses to the user while the current contextual features are not within a threshold. In some implementations, the user may be prompted to provide an indication of the current scenario and/or what device the user has interest in interacting with in the current scenario. For example, the user can be provided with an audio prompt of "What are you doing right now?" and the user can respond with an already known scenario (e.g., "I'm cooking") or a new scenario (e.g., "I'm driving"). If the current scenario is an already known scenario, one or more of the scenario features and/or areas can be updated to better refine what current contextual features indicate one or more of the known scenario features. Also, for example, if the user indicates a new scenario, the current contextual features can be utilized to generate a new scenario feature and the user can be further prompted to provide an indication of which device should handle interactions while the scenario is occurring.

In some implementations, current contextual features may be within a threshold area of multiple scenario features. For example, referring to FIG. 6C, an illustration of an embedding space is provided that includes a current contextual feature that is within a threshold of two different scenario features. As illustrated, scenario features 645A are associated with an area 645B and scenario features 650A are associated with an area 650B. As previously described, those current contextual features that map to a location within the threshold areas in proximity to scenario features can be considered to be indicative of that scenario. However, as illustrated, current contextual feature 660 falls within multiple scenario areas. Thus, device determination engine 140 cannot determine whether to select the device associated with scenario features 645A or the device associated with scenario features 650A. In response, the user may be prompted to indicate which, if either, of the scenarios is currently occurring. Device determination engine 140 can then select the corresponding device to respond to the user. Further, one or more of the areas can be updated and/or otherwise changed to reflect that the current contextual features are associated with one of the scenarios over the other scenario(s). For example, referring to FIG. 6D, in response to an indication from the user that the current contextual features 660 are indicative of the scenario associated with 645A, new areas 665B and 670B are determined for each of the scenario features. Thus, for subsequent features that are received, the areas do not overlap and are more refined to indicate what current contextual features are indicative of each of the scenarios.

Figure 7A:
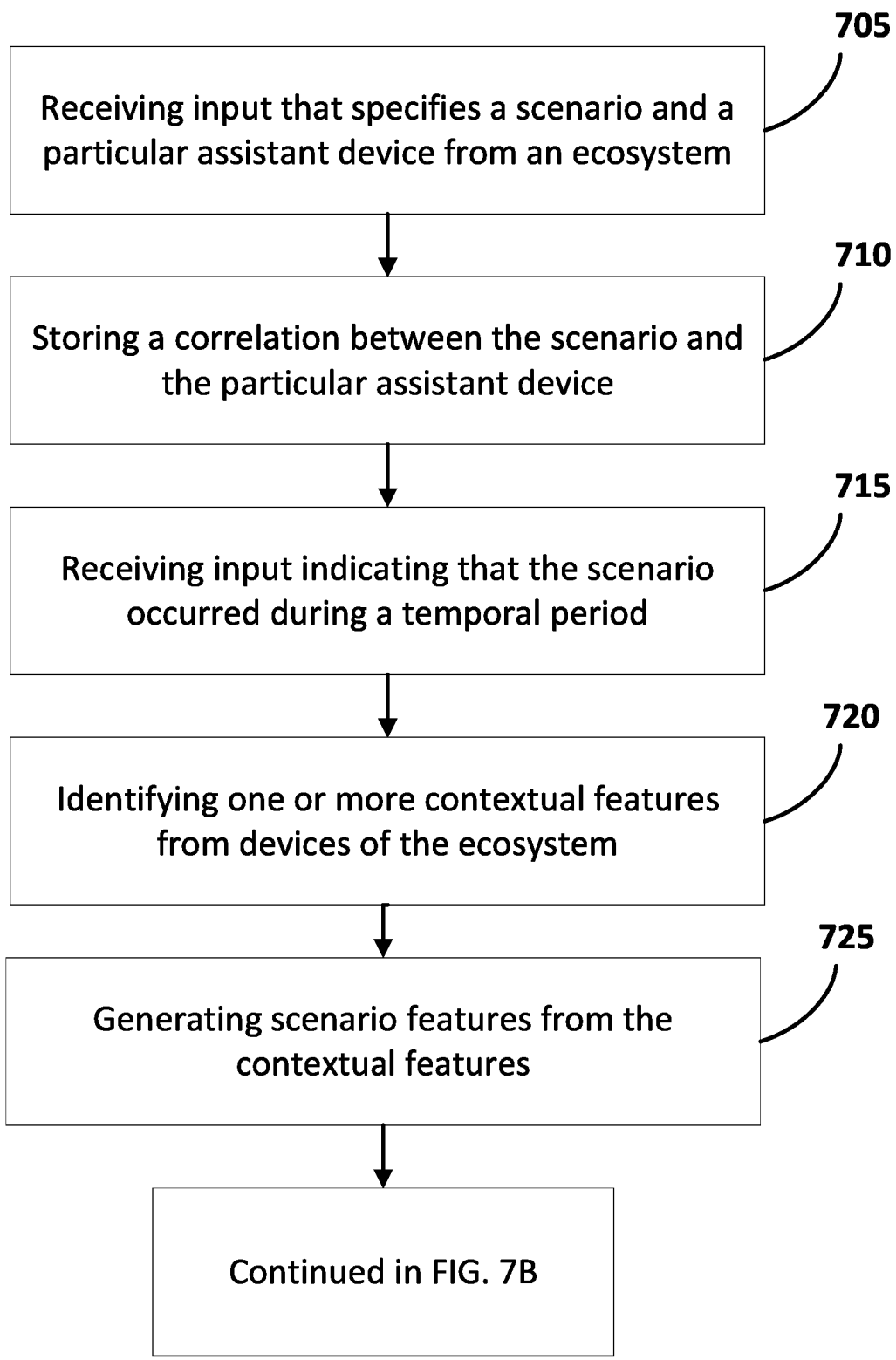
FIG. 7A and FIG. 7B is a flowchart illustrating an example method according to various implementations disclosed herein.
Figure 7B:
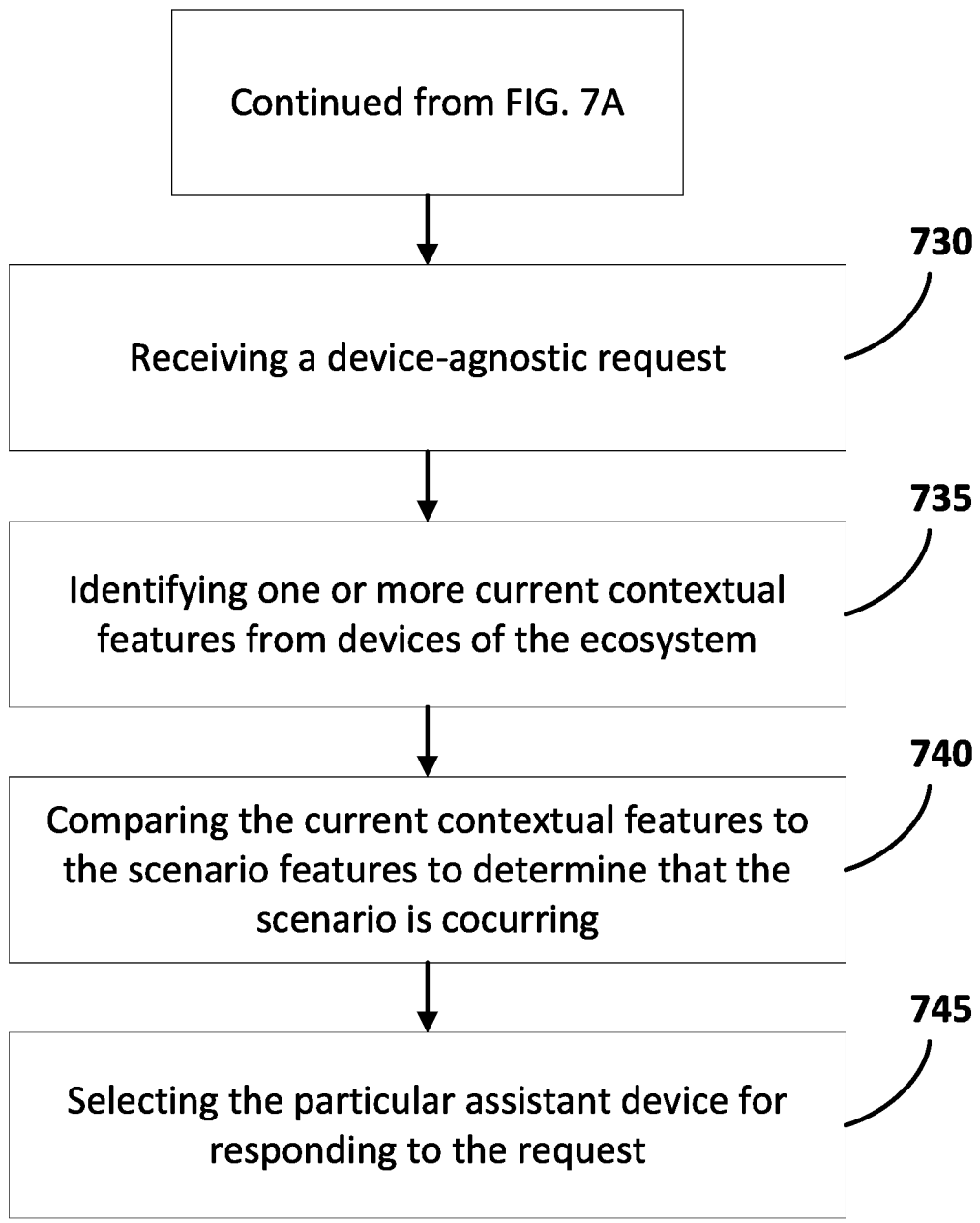

FIGS. 7A and 7B depicts a flowchart illustrating an example method of selecting a device, of an ecosystem of devices, to utilize in responding to a user while a determined scenario is occurring. For convenience, the operations of the method are described with reference to a system that performs the operations, such as the system illustrated in FIG. 1. This system of method includes one or more processors and/or other component(s) of a client device. Moreover, while operations of the method are shown in a particular order, this is not meant to be limiting. One or more operations may be reordered, omitted, or added.

At step 705, input is received from the user that indicates a scenario and a particular device, from an ecosystem of devices, that the user has indicated to respond while the scenario is occurring. The input can be received by a device that shares one or more characteristics with assistant input device 106 of FIG. 1. For example, the user can indicate, during setup of a device, that for a scenario of "cooking," a "kitchen speaker" device should be utilized to respond to requests. Also, for example, the user may indicate, via audio and/or video input via a user interface component 107, that "When I am cooking, use the kitchen speaker." In some implementations, the user can indicate which device to select for responses while the scenario is occurring. For example, the user interface input indicating that the specified device of the user may be provided by the user contemporaneously with the scenario occurring. In some implementations, the user can first indicate the scenario and, at a later time, indicate that the scenario is occurring.

At step 710, a correlation is stored that indicates an association between the scenario and the particular assistant device indicated by the user. The correlation can be stored in a database that shares one or more characteristics with scenarios database 194. For example, in some implementations, the scenarios can be stored on an assistant input device 106 of the ecosystem. In some implementations, the scenarios can be stored in a database that is a component of a cloud-based automated assistant 119.

At step 715, input is received indicating that the scenario occurred during a temporal period. For example, input can be received from the user, via one of the devices 106, indicating that a scenario is currently occurring (e.g., indicating "cooking" via an interface that is provided to the user). Also, for example, the user can indicate a scenario that occurred during a previous temporal period (e.g., "I worked today from 9 to 5").

At step 720, one or more contextual features are identified based on sensor data from sensors of one or more devices of the ecosystem. The contextual features can be generated by a component that shares one or more characteristics with encoder 120 of FIG. 1. For example, sensor data from sensors 105 can be encoded by encoder 120 into an encoding that can be provided to one or more other components, such as cloud-based automated assistant component(s) 119 as contextual features. The contextual features can be encoded such that the sensor data that was utilized to generate the encoding cannot be determined based on the encoding. Thus, by encoding the sensor data, sensor data remains at the device level and is not provided to other components, thereby improving security.

At step 725, scenario features are generated from the contextual features. The scenario features can be generated by a component that shares one or more characteristics with feature aggregation engine 130 of FIG. 1. For example, as illustrated in FIG. 4A, contextual features can be received from multiple devices and the device contextual features can be combined by feature aggregation engine 130 to generate scenario features. The scenario features can be stored in a database that shares one or more characteristics with scenario features database 193, as described herein.

Referring to FIG. 7B, at step 730, a device agnostic request is received from the user. A device-agnostic request can include a request for an automated assistant to perform an action but does not indicate a device that should respond and/or perform the action. In instances whereby an ecosystem of connected devices are each executing automated assistant clients, any of the devices may be configured to respond. For example, referring to FIG. 2, an ecosystem of devices is illustrated that each can be executing an automated assistant client and can further be configured to respond to a request.

At step 735, one or more current contextual features are identified from sensor data of one or more sensors of the devices of the ecosystem. The sensors can share one or more characteristics with sensors 105. In some implementations, the current contextual features can be identified by the individual devices, encoded utilizing a component that shares one or more characteristics with encoder 120, and provides to a component an encoding based on the sensor data, as previously described with respect to step 715.

At step 740, the current contextual features are compared to the scenario features to determine whether the scenario is occurring. Comparing the scenario features to the current contextual features can include, for example, determining a distance between the current contextual features and the scenario features (e.g., Euclidean distance) and/or determining that the current contextual features are embedded in an area that includes the scenario features.

At step 745, the particular assistant device is selected for responding to the device-agnostic request based on the comparison of the current contextual features with the scenario features. For example, the scenario can be identified based on the correlation of the scenario features with the scenario in scenario features database 193. Further, the correlation between the scenario and a specified device can be identified from the scenarios database 194. The correlated device can then be utilized to respond to the user request while the determined scenario is occurring.

Figure 8A:
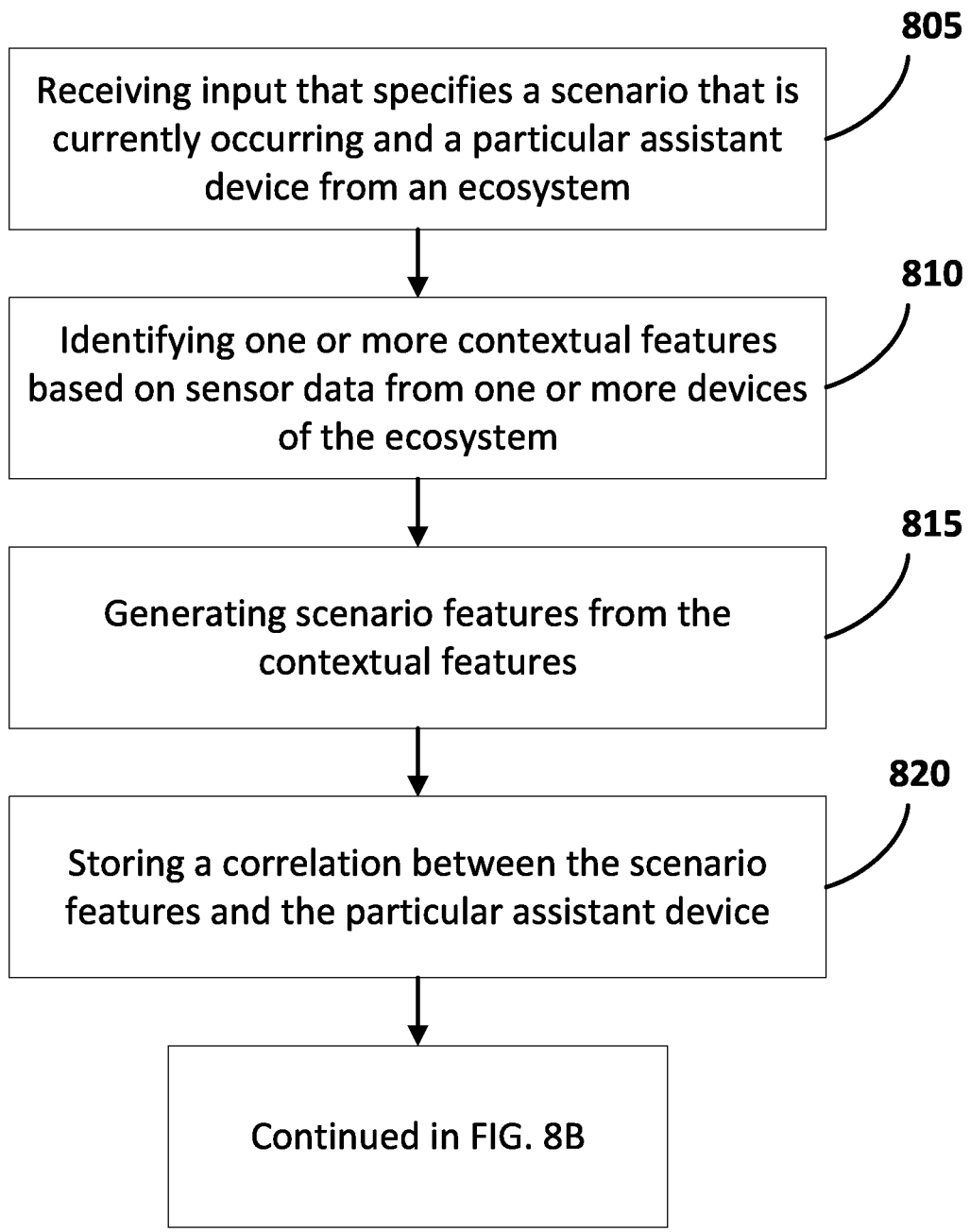
FIG. 8A and FIG. 8B is a flowchart illustrating an example method according to various implementations disclosed herein.
Figure 8B:
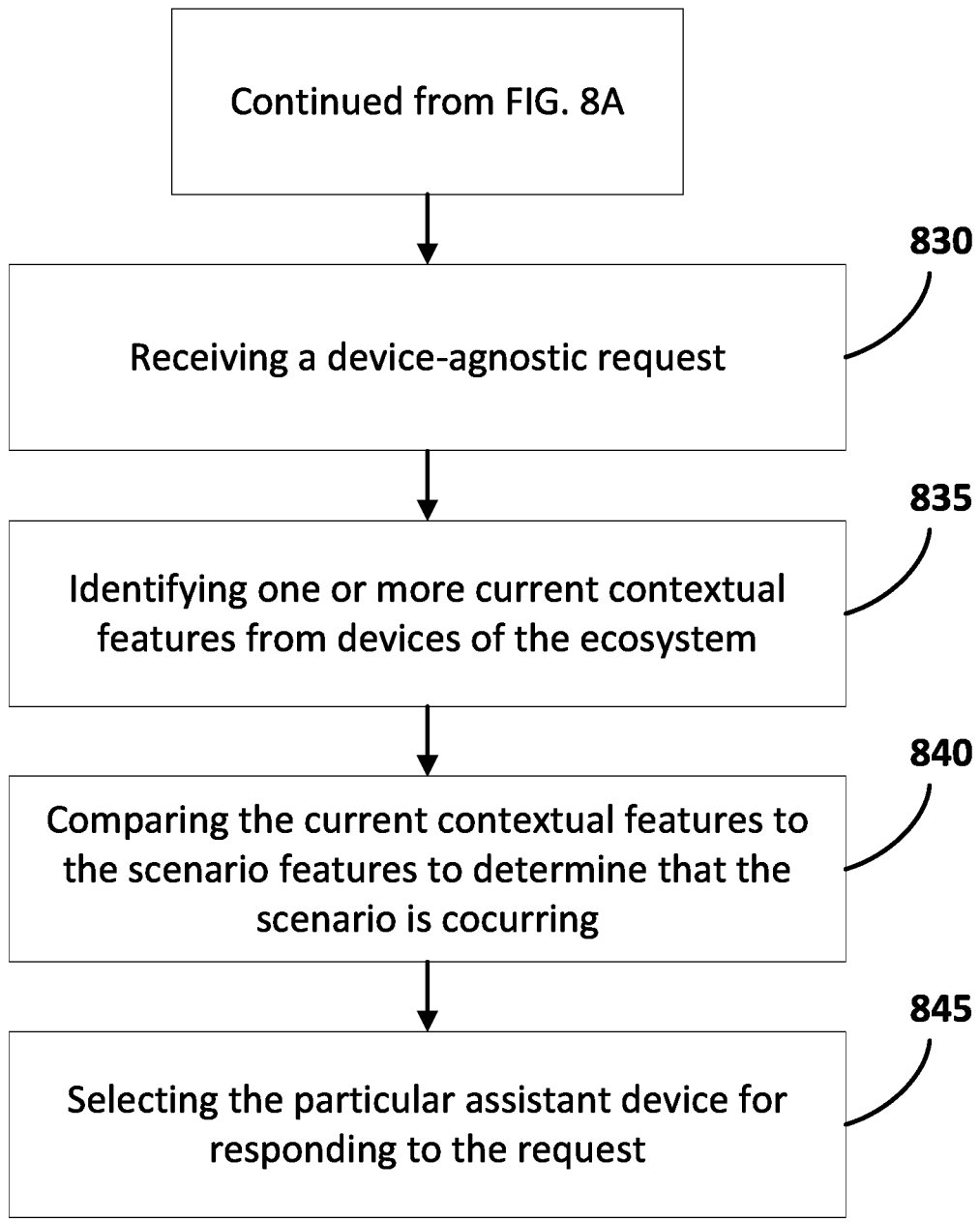

FIG. 8A-B depicts a flowchart illustrating another example method of selecting a device, of an ecosystem of devices, to utilize in responding to a user while a determined scenario is occurring. For convenience, the operations of the method are described with reference to a system that performs the operations, such as the system illustrated in FIG. 1. This system of method includes one or more processors and/or other component(s) of a client device. Moreover, while operations of the method are shown in a particular order, this is not meant to be limiting. One or more operations may be reordered, omitted, or added.

At step 805, input that specifies a scenario that is currently occurring and a particular assistant device from an ecosystem of devices is received. As previously described herein and in particular with respect to step 705 of FIG. 7, the input can be received from one or more devices that are part of a connected ecosystem of devices. In some implementations, the input can be received contemporaneously with the one or more contextual features that are identified at step 810. For example, a user can indicate that a current scenario is occurring and one or more of the devices of the ecosystem can generate contextual features and provide the contextual features to a cloud-based automated assistant component 119. At step 815, feature aggregation engine 130 can generate scenario features, as previously described, and store the scenario features with an indication of the particular assistant device (at step 820). Steps 830-845 can share one or more features with steps 725-745 of FIG. 7B.

Figure 9B:
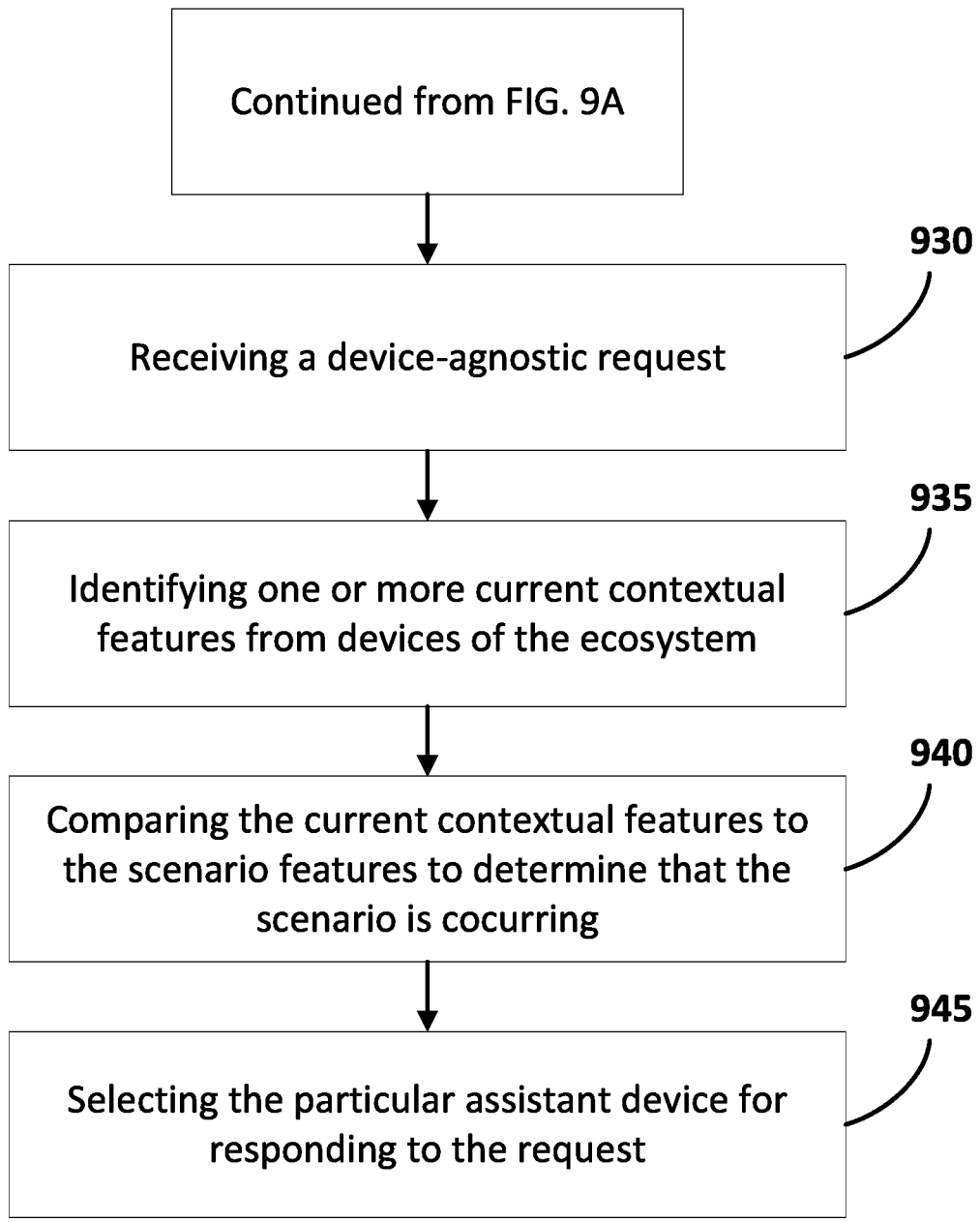

FIG. 9A-B depicts a flowchart illustrating yet another example method of selecting a device, of an ecosystem of devices, to utilize in responding to a user while a determined scenario is occurring. For convenience, the operations of the method are described with reference to a system that performs the operations, such as the system illustrated in FIG. 1. This system of method includes one or more processors and/or other component(s) of a client device. Moreover, while operations of the method are shown in a particular order, this is not meant to be limiting. One or more operations may be reordered, omitted, or added.

At optional step 905, an initial device-agnostic request is received. As previously described herein, a device-agnostic request can include a request that does not specify which device should handle the request and/or provide a response. At step 910, one of the devices of an ecosystem of devices is selected. For example, using one or more techniques (e.g., audio data analysis, presence sensor data), the device that is closest to the user can be selected to provide a response. At step 915, the selected device rendered a response to the request.

At step 920, user input is received that indicates a different device to handle responses while a current scenario is occurring. For example, the user may initially request "OK Assistant, set a timer for 10 minutes," and a smartphone of the ecosystem of devices can be selected to respond. The user can then provide user input that indicates "Use my kitchen speaker when I'm cooking."

At step 925, one or more scenario features are identified. Step 925 can share one or more characteristics with steps 725 and 815. For example, contextual features can be received from the one or more devices of the ecosystem and combined by feature aggregation engine 130. At step 928, the scenario features are stored with a correlation with the specified assistant device, such as in scenario features database 193. Steps 930-945 can share one or more features with steps 730-745 of FIG. 7B.

Although implementations and examples described herein relate a single user, in some implementations, multiple users can utilize the same ecosystem of devices and/or can each have an ecosystem of devices that share one or more devices. In those instances, each user can have one or more scenarios that are associated with a user account and/or profile such that, when a user utters a request to generate a new scenario, as described herein, the scenario can be stored with an indication of the user profile. Thus, subsequently, when a user utters a device-agnostic request, the utterance can be utilized to first perform TD-SID and a profile of the user can be identified. Thus, the scenarios for that particular user can be utilized, as described herein, to determine what device to select for responding to the request. In other words, given the same or similar current contextual features, two users may select different scenarios and/or different devices to respond to what would otherwise appear to be the same environmental conditions.

Further, although implementations and examples described herein are related to selecting a particular device based on current contextual features indicating a scenario that is currently occurring, other implementations can provide for the user indicating a specific profile and/or automated assistant to respond to profile- and automated assistant-agnostic requests. For example, a user can have a work profile and a home profile, each of which can access different applications and/or other information. The user can indicate "I am currently working. Use my work profile," and, when current contextual features indicate that the scenario of "working" is occurring, the automated assistant can select a work profile when responding to the user. Also, for example, a user can have a first and a second automated assistant that are executing on a device and indicate "When I am exercising, I want to talk to Assistant 1." Scenario features can be identified and stored with an indication of "Assistant 1" for the scenario "exercising," and, when the user subsequently indicates "What is on TV right now" while the scenario of "exercising" is identified from current contextual features, "Assistant 1" can be selected to respond to the request.

Figure 10:
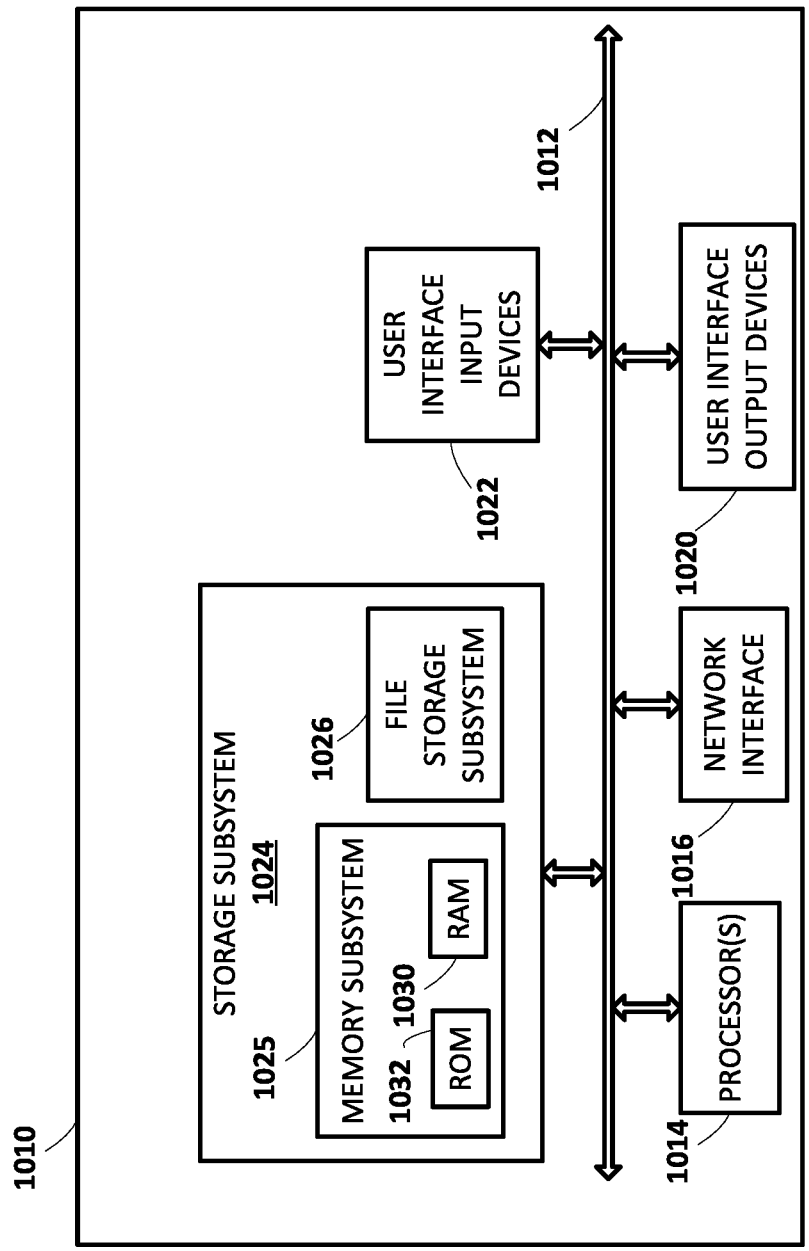
FIG. 10 illustrates an example architecture of a computing device.

FIG. 10 is a block diagram of an example computing device 1010 that may optionally be utilized to perform one or more aspects of techniques described herein. Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the method of FIGS. 4-6, and/or to implement various components depicted in FIG. 1 and FIG. 3.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In some implementations, a method is disclosed and includes the steps of: receiving user interface input that specifies a scenario, and a particular assistant device, of an ecosystem of linked assistant devices, to be utilized for interfacing with a user during automated assistant interactions when a subsequent device-agnostic request is received while the scenario is occurring; storing, in response to receiving the user interface input, an entry defining a correlation of the scenario to the particular assistant device; and receiving an instance of further user interface input that indicates the scenario occurred during a given temporal period. In response to receiving the instance of further user interface input, the method further includes identifying one or more contextual features present during the given temporal period, the one or more contextual features generated based on one or more sensors of one or more of the linked assistant devices; and generating, based on the contextual features, scenario features for the scenario. Subsequent to receiving the user interface input and the further user interface input, the method further includes receiving, via one or more assistant devices of the ecosystem of linked assistant devices, a device-agnostic assistant request; identifying, from one or more of the sensors, one or more current contextual features for the device-agnostic assistant request; determining, based on comparing the current contextual features to the scenario features, that the scenario is occurring; and selecting the particular assistant device for responding to the assistant request, where selecting the particular device is responsive to determining that the scenario is occurring and responsive to the entry defining the correlation of the scenario to the particular assistant device.

These and other implementations of the technology disclosed herein can include one or more of the following features.

In some implementations, the one or more contextual features include an encoding of given sensor data from the sensors of a given linked assistant device of the linked assistant devices. In some of those implementations, the encoding of the sensor data is generated by the given linked assistant device. In other of those implementations, generating the scenario features includes combining the encoding with one or more other encodings from other of the linked assistant devices of the ecosystem.

In some implementations, at least one of the user interface input and the further user interface input is received from a given linked assistant device, of the ecosystem, that is different from the particular assistant device for responding to the assistant request.

In some implementations, determining, based on comparing the current contextual features to the scenario features, that the scenario is occurring includes determining that the current contextual features are within a threshold distance of the scenario features.

In some implementations, the method further includes generating, based on the scenario features, an area in an embedding space, wherein contextual features that are embedded within the area are indicative of the scenario.

In some of those implementations, determining, based on comparing the current contextual features to the scenario features, that the scenario is occurring includes determining that the current contextual features are within the area.

In some implementations, the given temporal period is concurrent with receiving the instance of further user interface input. In other implementations, a method, implemented by one or more processors of a client device, is disclosed and includes the steps of: receiving user interface input that specifies a particular assistant device, of an ecosystem of linked assistant devices, to be utilized for interfacing with a user during automated assistant interactions while a scenario, that is currently occurring, subsequently is occurring when a device-agnostic request is received. In response to receiving the user interface input, the method further includes: identifying one or more first contextual features generated based on sensor data from one or more sensors of one or more of the linked assistant devices; generating, based on the first contextual features, one or more scenario features for the scenario; and storing an entry defining a correlation of the one or more scenario features with the particular assistant device. Subsequent to receiving the user interface input, the method further includes: receiving, via one or more assistant devices of the ecosystem of linked assistant devices, a device-agnostic assistant request; identifying, from one or more of the linked assistant devices, one or more current contextual features for the device-agnostic assistant request; determining, based on comparing the current contextual features to the scenario features, that the scenario is occurring; and selecting the particular assistant device for responding to the assistant request, where selecting the particular device is responsive to determining that the scenario is occurring and responsive to the entry defining the correlation between the one or more scenario features and the particular assistant device.

These and other implementations of the technology disclosed herein can include one or more of the following features.

In some implementations, the method further includes: identifying, based on the user interface input, a user profile associated with the user; and storing, with the entry, an indication of the user profile. In some of those implementations, the user interface input is audio data captured by one or more microphones of one or more of the devices of the ecosystem. In some instances, identifying the user profile includes performing speaker identification utilizing the audio data. In other instances, the method further includes receiving user feedback indicating whether the scenario was occurring when the particular assistant device was selected. In yet other instances, the method further includes updating the one or more scenario features in response to the user feedback and based on the one or more current contextual features.

In some implementations, another a method, implemented by one or more processors of a client device, is provided, and includes the steps of: identifying one or more scenario features, generated based on sensor data from one or more sensors of one or more assistant devices, of an ecosystem of linked assistant devices, while a first scenario is occurring; storing the one or more scenario features with a correlation to an particular assistant device, of an ecosystem of linked assistant devices, that was specified by a user to be utilized for interfacing with the user during automated assistant interactions when the scenario is occurring; receiving, via one or more assistant devices of the ecosystem of linked assistant devices, a device-agnostic assistant request; identifying one or more current contextual features for the device-agnostic assistant request; determining, based on comparing the current contextual features to the scenario features, that the scenario is occurring; and selecting the particular assistant device for responding to the assistant request, where selecting the particular assistant device is responsive to determining that the scenario is occurring and is responsive to the correlation of the one or more scenario features with the automated assistant device.

These and other implementations of the technology disclosed herein can include one or more of the following features.

In some implementations, the includes, prior to identifying the one or more scenario features, receiving user interface input that specifies the particular assistant device, with an indication that the scenario is occurring.

In some implementations, prior to receiving the user interface input, the method includes receiving, via one or more assistant devices of the ecosystem of linked assistant devices, an initial device-agnostic assistant request; and selecting a different one of the devices of the ecosystem, that is different than the particular assistant device, for responding to the initial device-agnostic assistant request; and causing a response to the initial device-agnostic assistant request to be rendered by the different one of the devices of the ecosystem. In some of those implementations, selecting a different one of the devices of the ecosystem includes: determining a proximity of each of the devices of the ecosystem to the user; and selecting the different one of the devices based on the proximities of the devices. In some of those implementations, the user interface input that specifies the particular assistant device further indicates a user preference of the particular assistant device over the different device while the scenario is occurring.

These and other implementations of the technology disclosed herein can include one or more of the following features.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method, implemented by one or more processors of a client device, comprising:
receiving user interface input that specifies:
a scenario, and
a particular assistant device, of an ecosystem of linked assistant devices, to be utilized for interfacing with a user during automated assistant interactions when a subsequent device-agnostic request is received while the scenario is occurring;
storing, in response to receiving the user interface input, an entry defining a correlation of the scenario to the particular assistant device;
receiving an instance of further user interface input that indicates the scenario occurred during a given temporal period;
in response to receiving the instance of further user interface input:
identifying one or more contextual features present during the given temporal period, the one or more contextual features generated based on one or more sensors of one or more of the linked assistant devices;
generating, based on the contextual features, scenario features for the scenario;
subsequent to receiving the user interface input and the further user interface input:
receiving, via one or more assistant devices of the ecosystem of linked assistant devices, a device-agnostic assistant request;
identifying, from one or more of the sensors, one or more current contextual features for the device-agnostic assistant request;
determining, based on comparing the current contextual features to the scenario features, that the scenario is occurring; and
selecting the particular assistant device for responding to the assistant request, where selecting the particular device is responsive to determining that the scenario is occurring and responsive to the entry defining the correlation of the scenario to the particular assistant device.

2. The method of claim 1, wherein the one or more contextual features include an encoding of given sensor data from the sensors of a given linked assistant device of the linked assistant devices.

3. The method of claim 2, wherein the encoding of the sensor data is generated by the given linked assistant device.

4. The method of claim 2, wherein generating the scenario features includes combining the encoding with one or more other encodings from other of the linked assistant devices of the ecosystem.

5. The method of claim 1, wherein at least one of the user interface input and the further user interface input is received from a given linked assistant device, of the ecosystem, that is different from the particular assistant device for responding to the assistant request.

6. The method of claim 1, wherein determining, based on comparing the current contextual features to the scenario features, that the scenario is occurring includes:
determining that the current contextual features are within a threshold distance of the scenario features.

7. The method of claim 1, further comprising:
generating, based on the scenario features, an area in an embedding space, wherein contextual features that are embedded within the area are indicative of the scenario.

8. The method of claim 7, wherein determining, based on comparing the current contextual features to the scenario features, that the scenario is occurring includes:
determining that the current contextual features are within the area.

9. The method of claim 1, wherein the given temporal period is concurrent with receiving the instance of further user interface input.

10. A method, implemented by one or more processors of a client device, comprising:
receiving user interface input that specifies a particular assistant device, of an ecosystem of linked assistant devices, to be utilized for interfacing with a user during automated assistant interactions while a scenario, that is currently occurring, subsequently is occurring when a device-agnostic request is received;
in response to receiving the user interface input:
identifying one or more first contextual features generated based on sensor data from one or more sensors of one or more of the linked assistant devices;
generating, based on the first contextual features, one or more scenario features for the scenario;
storing an entry defining a correlation of the one or more scenario features with the particular assistant device;
subsequent to receiving the user interface input:
receiving, via one or more assistant devices of the ecosystem of linked assistant devices, a device-agnostic assistant request;
identifying, from one or more of the linked assistant devices, one or more current contextual features for the device-agnostic assistant request;
determining, based on comparing the current contextual features to the scenario features, that the scenario is occurring; and
selecting the particular assistant device for responding to the assistant request, where selecting the particular device is responsive to determining that the scenario is occurring and responsive to the entry defining the correlation between the one or more scenario features and the particular assistant device.

11. The method of claim 10, further comprising:
identifying, based on the user interface input, a user profile associated with the user; and
storing, with the entry, an indication of the user profile.

12. The method of claim 11, wherein the user interface input is audio data captured by one or more microphones of one or more of the devices of the ecosystem.

13. The method of claim 12, wherein identifying the user profile includes performing speaker identification utilizing the audio data.

14. The method of claim 12, further comprising:
receiving user feedback indicating whether the scenario was occurring when the particular assistant device was selected.

15. The method of claim 14, further comprising:
updating the one or more scenario features in response to the user feedback and based on the one or more current contextual features.

16. A method, implemented by one or more processors of a client device, comprising:
identifying one or more scenario features, generated based on sensor data from one or more sensors of one or more assistant devices, of an ecosystem of linked assistant devices, while a first scenario is occurring;
storing the one or more scenario features with a correlation to a particular assistant device, of the ecosystem of linked assistant devices, that was specified by a user to be utilized for interfacing with the user during automated assistant interactions when the scenario is occurring;

receiving, via one or more assistant devices of the ecosystem of linked assistant devices, a device-agnostic assistant request;

identifying one or more current contextual features for the device-agnostic assistant request;

determining, based on comparing the current contextual features to the scenario features, that the scenario is occurring; and selecting the particular assistant device for responding to the assistant request, where selecting the particular assistant device is responsive to determining that the scenario is occurring and is responsive to the correlation of the one or more scenario features with the particular assistant device.

17. The method of claim 16, further comprising:

prior to identifying the one or more scenario features, receiving user interface input that specifies the particular assistant device, with an indication that the scenario is occurring.

18. The method of claim 17, further comprising:

prior to receiving the user interface input:

receiving, via one or more assistant devices of the ecosystem of linked assistant devices, an initial device-agnostic assistant request; and selecting a different one of the devices of the ecosystem, that is different than the particular assistant device, for responding to the initial device-agnostic assistant request; and causing a response to the initial device-agnostic assistant request to be rendered by the different one of the devices of the ecosystem.

19. The method of claim 18, wherein selecting a different one of the devices of the ecosystem includes:

determining a proximity of each of the devices of the ecosystem to the user; and selecting the different one of the devices based on the proximities of the devices.

20. The method of claim 17, wherein the user interface input that specifies the particular assistant device further indicates a user preference of the particular assistant device over the different device while the scenario is occurring.

* * * * *